(12) United States Patent
Yoon et al.

(10) Patent No.: US 12,501,261 B2
(45) Date of Patent: Dec. 16, 2025

(54) METHOD OF OPERATING SNIFFING-BASED STATUS DETECTION AND NOTIFICATION SYSTEM, AND METHOD OF OPERATING ELECTRONIC DEVICE INCLUDED THEREIN

(71) Applicant: SAMSUNG ELECTRONICS CO., LTD., Suwon-si (KR)

(72) Inventors: Wondeuk Yoon, Suwon-si (KR); Sangho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 18/121,136

(22) Filed: Mar. 14, 2023

(65) Prior Publication Data
US 2023/0345235 A1 Oct. 26, 2023

(30) Foreign Application Priority Data
Apr. 22, 2022 (KR) .................. 10-2022-0050195

(51) Int. Cl.
| | | |
|---|---|---|
| H04W 12/033 | (2021.01) | |
| H04W 4/02 | (2018.01) | |
| H04W 76/14 | (2018.01) | |

(52) U.S. Cl.
CPC ......... *H04W 12/033* (2021.01); *H04W 4/023* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 8,023,895 B2 | 9/2011 | Smith | |
| 2014/0222685 A1* | 8/2014 | Middleton | H04W 4/023 705/50 |
| 2021/0136711 A1 | 5/2021 | Chen et al. | |
| 2022/0109561 A1* | 4/2022 | Yang | B60R 25/24 |
| 2022/0360942 A1* | 11/2022 | Xue | H04W 4/02 |

(Continued)

FOREIGN PATENT DOCUMENTS

| | | |
|---|---|---|
| JP | 6749828 B2 | 9/2020 |
| JP | 2021-185643 A | 12/2021 |
| KR | 10-1546346 B1 | 8/2015 |

(Continued)

*Primary Examiner* — Jeffrey R Swearingen
(74) *Attorney, Agent, or Firm* — Sughrue Mion, PLLC

(57) ABSTRACT

In a method of operating an electronic device configured to communicate with a first external electronic device, a first communication link establishment request for establishing a first communication link between the electronic device and the first external electronic device is transmitted to the first external electronic device. Based on establishment of the first communication link, first link information, associated with a second communication link between the first external electronic device and a second external electronic device, is received from the first external electronic device. A first communication packet exchanged between the first external electronic device and the second external electronic device is sniffed based on the first link information. A first notification signal is generated based on a condition being met, the condition being met based on the sniffed first communication packet.

20 Claims, 23 Drawing Sheets

(56) References Cited

U.S. PATENT DOCUMENTS

2023/0184914 A1* 6/2023 Lagnado ................ G01S 11/06
455/456.1

FOREIGN PATENT DOCUMENTS

| KR | 10-2016-0065275 A | 6/2016 |
|---|---|---|
| KR | 10-1653871 B1 | 9/2016 |
| KR | 10-1710322 B1 | 2/2017 |
| KR | 10-2017-0134941 A | 12/2017 |
| KR | 10-2021-0101702 A | 8/2021 |
| KR | 10-2334655 B1 | 12/2021 |

* cited by examiner

METHOD OF OPERATING SNIFFING-BASED STATUS DETECTION AND NOTIFICATION SYSTEM, AND METHOD OF OPERATING ELECTRONIC DEVICE INCLUDED THEREIN

CROSS-REFERENCE TO RELATED APPLICATION

This application claims priority under 35 USC § 119 to Korean Patent Application No. 10-2022-0050195 filed on Apr. 22, 2022 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of operating sniffing-based status (e.g., theft/loss) detection and notification systems, and methods of operating electronic devices included in the status (e.g., theft/loss) detection and notification systems.

2. Description of the Related Art

Recently, with the spread of short-range wireless communication, portable electronic devices (e.g., smart phones and smart watches) that are interoperable with each other are being used. In addition, portable electronic devices are being reduced in weight and/or size, and thus the risk of a misuse such as theft and/or loss is increasing. Therefore, various techniques for preventing the misuse of portable electronic devices have been researched. For example, a notification signal may be generated when the possible theft and/or loss of portable electronic devices is detected, and users may prevent or handle the theft and/or loss of portable electronic devices based on the notification signal.

SUMMARY

At least one example embodiment of the present disclosure provides a method of operating a status detection and notification system capable of efficiently detecting and notifying the detected status of a portable electronic device based on a sniffing technology.

According to an aspect of an example embodiment, there is provided a method of operating an electronic device configured to communicate with a first external electronic device, the method including: transmitting, by the electronic device, a first communication link establishment request to the first external electronic device, the first communication link establishment request being a request for establishing a first communication link between the electronic device and the first external electronic device; transmitting, by the electronic device, a first communication link establishment completion response to the first external electronic device, the first communication link establishment completion response representing that an establishment of the first communication link is successfully completed; transmitting, by the electronic device, a first request to the first external electronic device, the first request being a request for receiving first link information associated with a second communication link between the first external electronic device and a second external electronic device different from the first external electronic device; receiving, by the electronic device, the first link information associated with the second communication link from the first external electronic device, based on the first request; sniffing, by the electronic device, a first communication packet based on the first link information, the first communication packet being exchanged between the first external electronic device and the second external electronic device; and generating, by the electronic device, a first notification signal based on a condition being met, the condition being met based on the sniffed first communication packet.

According to an aspect of an example embodiment, there is provided a method of operating an electronic device configured to communicate with a first external electronic device and a second external electronic device, the method including: transmitting, by the electronic device, a first communication link establishment request to the first external electronic device, the first communication link establishment request being a request for establishing a first communication link between the electronic device and the first external electronic device; transmitting, by the electronic device, a first communication link establishment completion response to the first external electronic device, the first communication link establishment completion response representing that an establishment of the first communication link is successfully completed; transmitting, by the electronic device, a second communication link establishment request to the second external electronic device, the second communication link establishment request being a request for establishing a second communication link between the electronic device and the second external electronic device; transmitting, by the electronic device, a second communication link establishment completion response to the second external electronic device, the second communication link establishment completion response representing that an establishment of the second communication link is successfully completed; receiving, by the electronic device, a first request from the first external electronic device, the first request being a request for providing first link information associated with the second communication link; transmitting, by the electronic device, the first link information associated with the second communication link to the first external electronic device; and exchanging, by the electronic device, a first communication packet with the second external electronic device based on the second communication link.

According to an aspect of an example embodiment, there is provided a method of operating a status detection and notification system that includes a first electronic device, a second electronic device and a third electronic device, the method including: transmitting, by the second electronic device, a first communication link establishment request to the first electronic device, the first communication link establishment request being a request for establishing a first communication link between the first electronic device and the second electronic device; transmitting, by the second electronic device, a first communication link establishment completion response to the first electronic device, the first communication link establishment completion response representing that an establishment of the first communication link is successfully completed; transmitting, by the second electronic device, a second communication link establishment request to the third electronic device, the second communication link establishment request being a request for establishing a second communication link between the second electronic device and the third electronic device; transmitting, by the second electronic device, a second communication link establishment completion response to the third electronic device, the second communication link establishment completion response representing that an establishment of the second communication link is successfully completed; receiving, by the second electronic device, a first request from the first electronic device, the first request being a request for receiving first link information associated with the second communication link; transmitting, by the second electronic device, the first link information associated with the second communication link to the first electronic device; and exchanging, by the second electronic device, a first communication packet with the third electronic device based on the second communication link, wherein based on sniffing of the first communication packet, the sniffing being based on the first link information, a first notification signal related to a status of the third electronic device is provided to a user.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
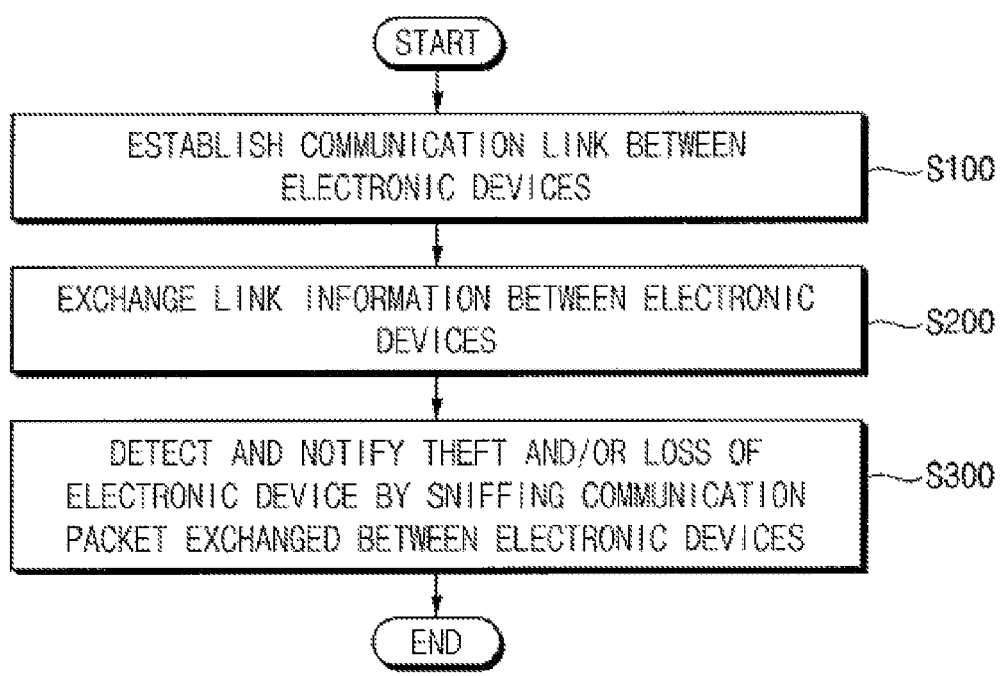
FIG. 1 is a flowchart illustrating a method of operating a status detection and notification system according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of operating a status (e.g., theft/loss) detection and notification system according to example embodiments. Hereinafter, for purpose of descriptions, example embodiments of the disclosure are described with an example of detecting and notifying possible theft/loss of an electronic device. However, the disclosure is not limited thereto and the method according to example embodiments may be used in a system for detection and notification of various statuses of an electronic device.

Referring to FIG. 1, a method of operating a theft/loss detection and notification system according to example embodiments is performed by a theft/loss detection and notification system that includes a plurality of electronic devices (e.g., three or more electronic devices). For example, the theft/loss detection and notification system may include an electronic device that performs a function of detecting and notifying the theft and/or loss of another electronic device, an electronic device that is a target of the function of detecting and notifying the theft and/or loss, and/or an electronic device that communicates with all other electronic devices. A configuration of the theft/loss detection and notification system will be described with reference to FIG. 2 and subsequent figures.

In the method of operating the theft/loss detection and notification system according to example embodiments, communication links (or electrical connections for communications) are established between the plurality of electronic devices (S100). For example, one communication link may be established between two electronic devices, and a plurality of communication links may be established among the plurality of electronic devices. For example, even if the plurality of communication links are established between the plurality of electronic devices, a communication link may not be established between two arbitrary electronic devices. For example, a communication link may not be established between the electronic device that performs the function of detecting and notifying the theft and/or loss and the electronic device that is the target of the function of detecting and notifying the theft and/or loss. Operation S100 will be described in detail with reference to FIG. 5 and subsequent figures.

Link information associated with or related to the communication links established between the plurality of electronic devices are exchanged between the plurality of electronic devices (S200). For example, the electronic device that performs the function of detecting and notifying the theft and/or loss may request and receive the link information associated with the communication link of the electronic device that is the target of the function of detecting and notifying the theft and/or loss. Operation S200 will be described in detail with reference to FIG. 6 and subsequent figures.

The theft and/or loss of the plurality of electronic devices may be detected and notified by sniffing communication packets exchanged between the plurality of electronic devices (S300). For example, even if the communication link is not directly established between the electronic device that performs the function of detecting and notifying the theft and/or loss and the electronic device that is the target of the function of detecting and notifying the theft and/or loss, the electronic device that performs the function of detecting and notifying the theft and/or loss may sniff a communication packet transmitted and received by the electronic device that is the target of the function of detecting and notifying the theft and/or loss using the link information obtained in S200, and may perform the function of detecting and notifying the theft and/or loss using the sniffed communication packet. Operation S300 will be described in detail with reference to FIG. 7 and subsequent figures.

Operation S100 may be referred to as a communication link establishment operation, S200 may be referred to as a communication link information exchange operation, and S300 may be referred to as a sniffing operation and a theft/loss detection and notification operation.

In the method of operating the theft/loss detection and notification system according to example embodiments, the electronic device may efficiently perform the function of detecting and notifying the theft and/or loss of another electronic device based on a sniffing technology, even if the communication link is not directly established between the electronic device that performs the function of detecting and notifying the theft and/or loss and the electronic device that is the target of the function of detecting and notifying the theft and/or loss. Accordingly, the theft/loss detection and notification service may be provided even if the electronic device that is the target of the function of detecting and notifying the theft and/or loss does not support additional technologies and functions. In addition, the theft/loss detection and notification service may be provided while maintaining the quality of service for the original function of the electronic device and/or while reducing energy consumption of the electronic device.

Figure 2:
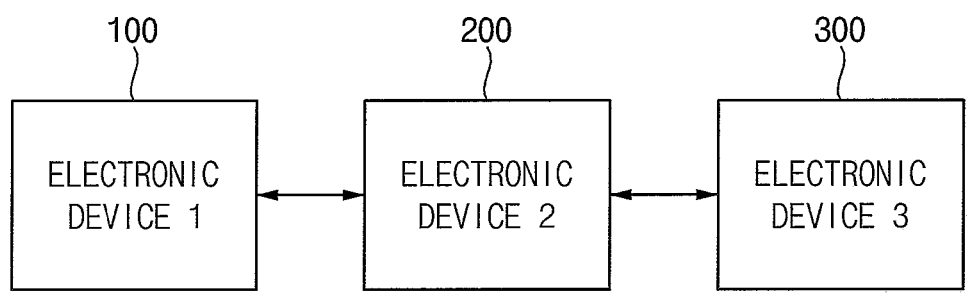
FIG. 2 is a block diagram illustrating a status detection and notification system according to example embodiments.

FIG. 2 is a block diagram illustrating a theft/loss detection and notification system according to example embodiments.

Referring to FIG. 2, a theft/loss detection and notification system 10 includes a first electronic device 100, a second electronic device 200 and a third electronic device 300.

The first electronic device 100 may be an electronic device that performs a function of detecting and notifying the theft and/or loss of another electronic device (e.g., the third electronic device 300). The third electronic device 300 may be an electronic device that is a target of the function of detecting and notifying the theft and/or loss. The second electronic device 200 may be an electronic device that communicates with the other electronic devices included in the theft/loss detection and notification system 10, e.g., that communicates with both the first and third electronic devices 100 and 300.

A communication link may be established between the first electronic device 100 and the second electronic device 200, and a communication link may be established between the second electronic device 200 and the third electronic device 300. However, a communication link may not be directly established between the first electronic device 100 and the third electronic device 300.

The first electronic device 100 may receive link information associated with the communication link that is established between the second electronic device 200 and the third electronic device 300 from the second electronic device 200, may sniff a communication packet exchanged between the second electronic device 200 and the third electronic device 300 based on the link information received from the second electronic device 200, and may generate a notification signal by detecting a theft and/or loss of the third electronic device 300 based on the sniffed communication packet.

In some example embodiments, each of the first electronic device 100, the second electronic device 200 and the third electronic device 300 may be a personal device owned by a user. For example, each of the first electronic device 100, the second electronic device 200 and the third electronic device 300 may be a portable electronic device.

FIGS. 3A, 3B, 3C and 3D are diagrams illustrating examples of electronic devices included in a theft/loss detection and notification system according to example embodiments.

Figure 3A:
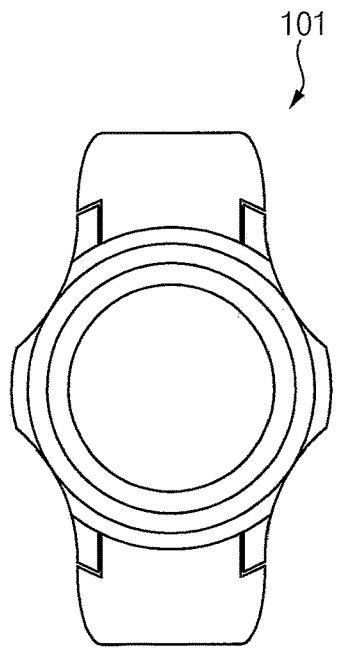
FIGS. 3A, 3B, 3C and 3D are diagrams illustrating examples of electronic devices included in a status detection and notification system according to example embodiments.

Referring to FIGS. 2 and 3A, a smart watch 101 is illustrated as an example of the first electronic device 100. However, example embodiments are not limited thereto, and the first electronic device 100 may be one of various types of an electronic device, e.g., one of various wearable devices. For example, the wearable devices may include a smart watch, a smart band, smart glasses, and/or the like, and may be implemented in various other forms.

Figure 3B:
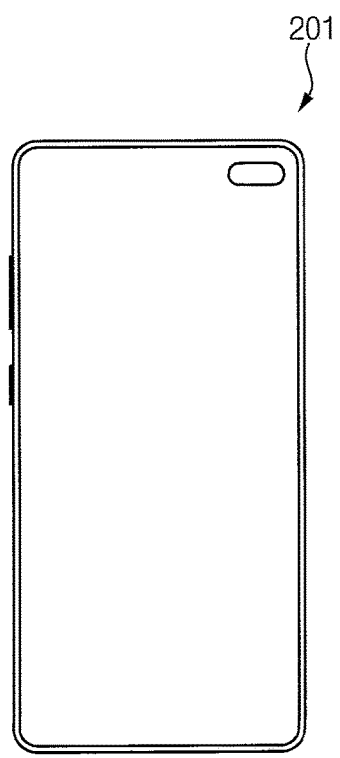

Referring to FIGS. 2 and 3B, a smart phone 201 is illustrated as an example of the second electronic device 200.

Figure 3C:
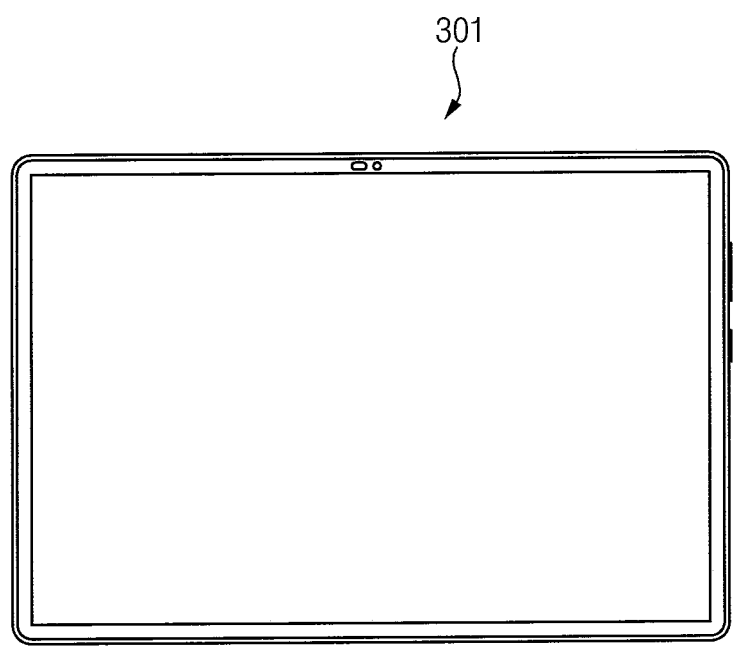
Figure 3D:
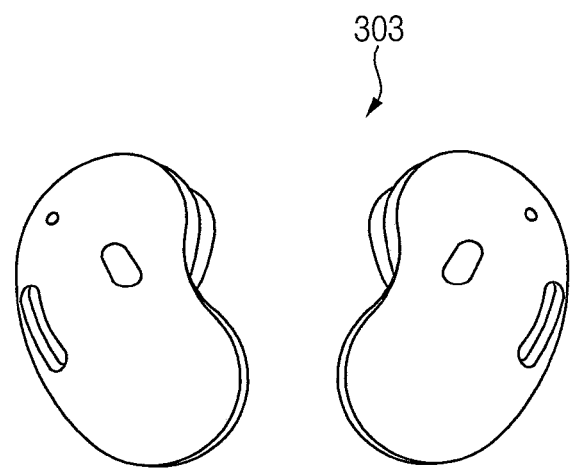

Referring to FIGS. 2, 3C and 3D, a tablet computer 301 and a wireless earphone 303 are illustrated as examples of the third electronic device 300.

Although FIGS. 3A, 3B, 3C and 3D illustrate that the first electronic device 100, the second electronic device 200 and the third electronic device 300 are implemented as the smart watch 101, the smart phone 201, the tablet computer 301 and the wireless earphone 303, example embodiments are not limited thereto. For example, each of the first electronic device 100, the second electronic device 200 and the third electronic device 300 may be implemented as various portable electronic devices and/or systems capable of communicating with other electronic devices, e.g., a laptop computer, a mobile phone, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

Figure 4:
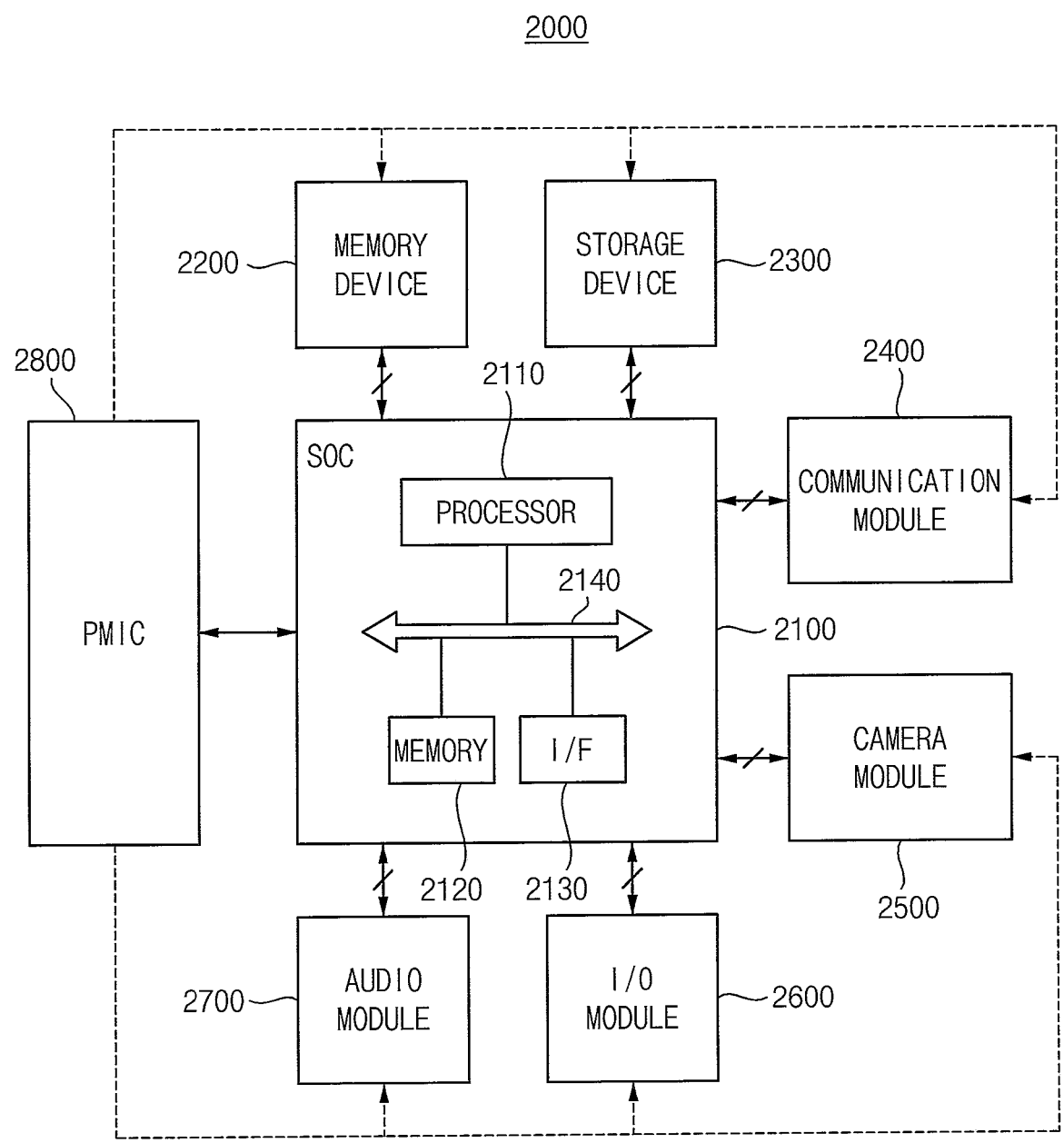
FIG. 4 is a block diagram illustrating an example of an electronic device included in a status detection and notification system according to example embodiments.

FIG. 4 is a block diagram illustrating an example of an electronic device included in a theft/loss detection and notification system according to example embodiments. The configuration shown in FIG. 4 may be applied to any one of the first electronic device 100, the second electronic device 200 and the third electronic device 300 shown in FIG. 2.

Referring to FIG. 4, an electronic device 2000 may include a system-on-chip (SOC) 2100, a memory device 2200, a storage device 2300, a plurality of functional modules 2400, 2500, 2600 and 2700, and a power management integrated circuit (PMIC) 2800.

The system-on-chip 2100 may control overall operations of the electronic device 2000. For example, the system-on-chip 2100 may control the memory device 2200, the storage device 2300 and the plurality of functional modules 2400, 2500, 2600 and 2700. For example, the system-on-chip 2100 may be an application processor (AP).

The system-on-chip 2100 may include at least one processor 2110, a memory 2120, an interface (I/F) 2130 and a system bus 2140. The processor 2110, the memory 2120 and the interface 2130 may be electrically connected to the system bus 2140.

The processor 2110 may control overall operations of the system-on-chip 2100 and the electronic device 2000. For example, the processor 2110 may perform various computational functions such as particular calculations and tasks, may execute an operating system (OS) to drive the electronic device 2000, and may execute various applications for providing an internet browser, a game, a video, a camera, or the like. For example, the processor 2110 may include a central processing unit (CPU), a microprocessor, or the like.

In some example embodiments, the processor 2110 may include a single processor core and/or a plurality of processor cores. For example, the processor 2110 may be implemented with a multi-core, such as a dual-core, a quad-core, a hexa-core, or the like. In some example embodiments, the processor 2110 may further include a cache memory that is located inside or outside the processor 2110.

The memory 2120 may stores data and/or instructions that are processed and/or executed by the processor 2110. For example, the memory 2120 may store a boot image for booting the electronic device 2000, a file system for the operating system to drive the electronic device 2000, a device driver for an external device connected to the electronic device 2000, and/or an application executed on the electronic device 2000. For example, the memory 2120 may include at least one of a volatile memory and a nonvolatile memory. For example, the memory 2120 may include tangible and/or non-transitory computer-readable storage media, such as random access memory (RAM), read only memory (ROM), a permanent mass storage device (such as, solid state (e.g., NAND flash) device, etc.), and/or any other like data storage mechanism capable of storing and recording data.

The interface 2130 may communicate with the outside of the system-on-chip 2100 (e.g., may communicate with the memory device 2200, the storage device 2300, the functional modules 2400, 2500, 2600 and 2700 and the power management integrated circuit 2800).

The memory device 2200 and the storage device 2300 may store data for operations of the electronic device 2000. The memory device 2200 may include a volatile memory device, such as a dynamic random access memory (DRAM), a static random access memory (SRAM), a mobile DRAM, or the like. The storage device 2300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. In some example embodiments, the storage device 2300 may further include an embedded multimedia card (eMMC), a universal flash storage (UFS), a solid state drive (SSD), a hard disk drive (HDD), a CD-ROM, etc.

The functional modules 2400, 2500, 2600 and 2700 may perform various functions of the electronic device 2000. For example, the electronic device 2000 may include a communication module 2400 that performs a communication function (e.g., a code division multiple access (CDMA) module, a 3G module, a long term evolution (LTE) or 4G module, a 5G module, a radio frequency (RF) module, an ultra-wideband (UWB) module, a wireless local area network (WLAN) module, a worldwide interoperability for a microwave access (WIMAX) module, or the like), a camera module 2500 that performs a camera function, an input/output (I/O) module 2600 including a display module that performs a display function and a touch panel module that performs a touch sensing function, and an audio module 2700 including a microphone (MIC) module, a speaker module, or the like, that performs input-output of audio signals. In some example embodiments, the electronic device 2000 may further include a global positioning system (GPS) module, a gyroscope module, or the like. However, the functional modules 2400, 2500, 2600 and 2700 in the electronic device 2000 are not limited thereto.

The power management integrated circuit 2800 may provide an operating voltage to the system-on-chip 2100, the memory device 2200, the storage device 2300 and the functional modules 2400, 2500, 2600 and 2700.

Figure 5:
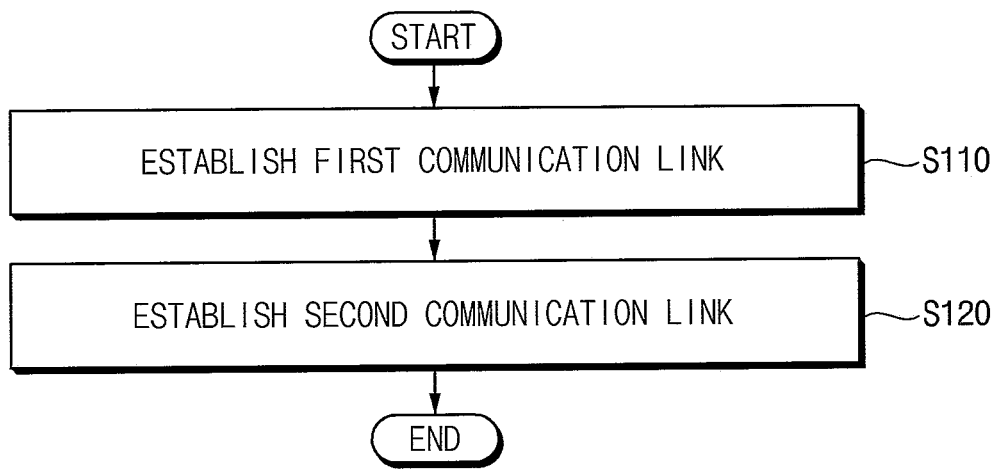
FIG. 5 is a flowchart illustrating an example of establishing communication links in FIG. 1.
Figure 6:
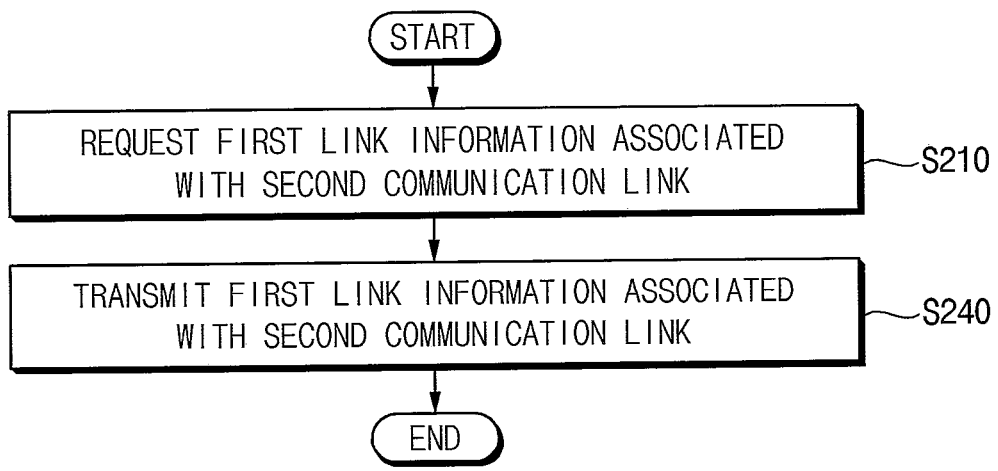
FIG. 6 is a flowchart illustrating an example of exchanging link information in FIG. 1.
Figure 7:
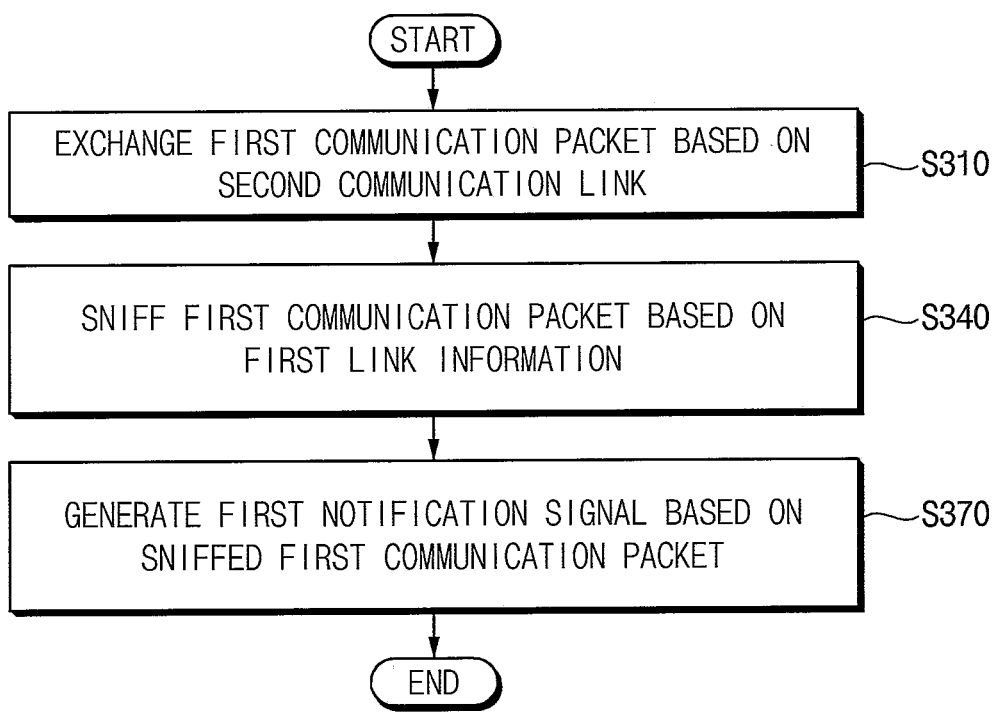
FIG. 7 is a flowchart illustrating an example of detecting and notifying a status in FIG. 1.
Figure 8:
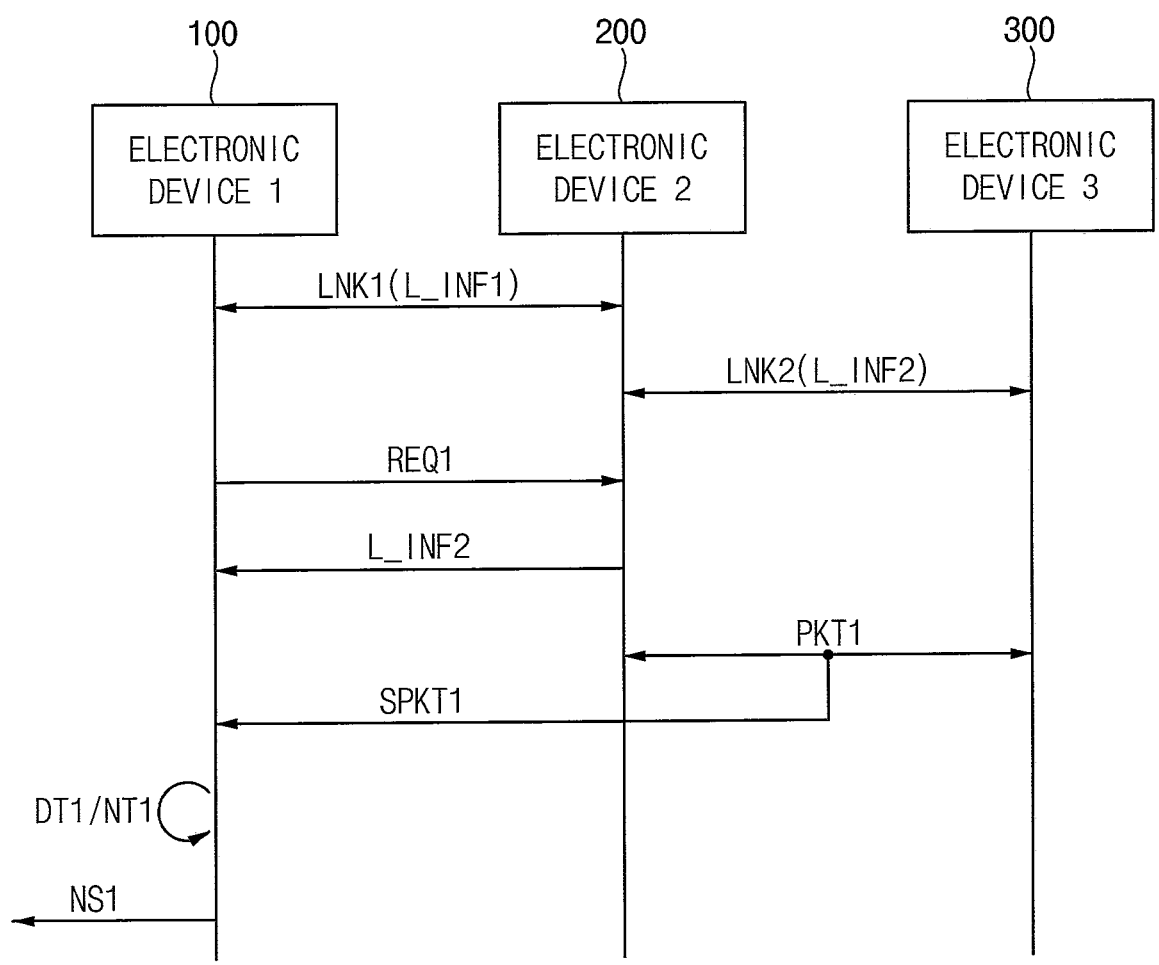
FIG. 8 is a diagram for describing operations of FIGS. 5, 6 and 7.

FIG. 5 is a flowchart illustrating an example of establishing communication links in FIG. 1. FIG. 6 is a flowchart illustrating an example of exchanging link information in FIG. 1. FIG. 7 is a flowchart illustrating an example of detecting and notifying theft and/or loss in FIG. 1. FIG. 8 is a diagram for describing operations of FIGS. 5, 6 and 7.

Referring to FIGS. 1, 5 and 8, when establishing the communication links between the plurality of electronic devices (S100), a first communication link LNK1 may be established between the first electronic device 100 and the second electronic device 200 (S110). For example, the second electronic device 200 may transmit a communication link establishment request to the first electronic device 100, and/or the first electronic device 100 may transmit a communication link establishment request to the second electronic device 200. Based on the communication link establishment request(s), the first electronic device 100 and the second electronic device 200 may perform operations related to establishing the first communication link LNK1, e.g., communication address exchange, key generation, key exchange, and/or the like. When the establishment of the first communication link LNK1 is successfully completed, the second electronic device 200 may transmit a communication link establishment completion response to the first electronic device 100, and/or the first electronic device 100 may transmit a communication link establishment completion response to the second electronic device 200.

A second communication link LNK2 may be established between the second electronic device 200 and the third electronic device 300 (S120). Operation S120 may be similar to S110. For example, the second electronic device 200 may transmit a communication link establishment request to the third electronic device 300, and/or the third electronic device 300 may transmit a communication link establishment request to the second electronic device 200. Based on the communication link establishment request(s), the second electronic device 200 and the third electronic device 300 may perform operations related to establishing the second communication link LNK2, e.g., communication address exchange, key generation, key exchange, and/or the like. When the establishment of the second communication link LNK2 is successfully completed, the second electronic device 200 may transmit a communication link establishment completion response to the third electronic device 300, and/or the third electronic device 300 may transmit a communication link establishment completion response to the second electronic device 200.

In some example embodiments, the first communication link LNK1 and the second communication link LNK2 may be established based on a wireless communication protocol. A wireless communication may be performed between the first electronic device 100 and the second electronic device 200 based on the first communication link LNK1, and a wireless communication may be performed between the second electronic device 200 and the third electronic device 300 based on the second communication link LNK2. For example, the first communication link LNK1 and the second communication link LNK2 may be established based on a Bluetooth. However, example embodiments are not limited thereto, and the first communication link LNK1 and the second communication link LNK2 may be established based on at least one of other various communication protocols.

Link information L_INF1 associated with the first communication link LNK1 may be generated as a result of establishing the first communication link LNK1, and link information L_INF2 associated with the second communication link LNK2 may be generated as a result of establishing the second communication link LNK2. The link information L_INF1 associated with the first communication link LNK1 may be stored and updated in the first electronic device 100 and the second electronic device 200, and the link information L_INF2 associated with the second communication link LNK2 may be stored and updated in the second electronic device 200 and the third electronic device 300.

In some example embodiments, the link information L_INF1 associated with the first communication link LNK1 may include communication address information between the first electronic device 100 and the second electronic device 200, and link key information related to encrypting and decrypting communication packets exchanged between the first electronic device 100 and the second electronic device 200. Similarly, the link information L_INF2 associated with the second communication link LNK2 may include communication address information between the second electronic device 200 and the third electronic device 300, and link key information related to encrypting and decrypting communication packets exchanged between the second electronic device 200 and the third electronic device 300. For example, the communication address information may include a unique device address, and/or the like. For example, the link key information may include a key corresponding to an encryption scheme selected in the communication link establishment process.

Although FIG. 5 illustrates that S110 is performed first and then S120 is performed, example embodiments are not limited thereto. For example, S120 may be performed first and then S110 may be performed. Alternatively, S110 and S120 may be performed substantially simultaneously. After all of S110 and S120 are performed, a condition for performing S200 in FIG. 1 may be satisfied. In another embodiment, at least one of the S110 and S120 may be performed and a condition for performing at least a part of S200 in FIG. 1 may be satisfied.

Referring to FIGS. 1, 6 and 8, when exchanging the link information associated with the communication links between the plurality of electronic devices (S200), the first electronic device 100 may request the link information L_INF2 associated with the second communication link LNK2, which is established between the second electronic device 200 and the third electronic device 300, to the second electronic device 200 (S210). The link information L_INF2 associated with the second communication link LNK2 may be referred to as first link information. For example, the first electronic device 100 may generate a first request REQ1 for the first link information L_INF2 and may transmit the first request REQ1 to the second electronic device 200, and the second electronic device 200 may receive the first request REQ1.

In response to the request from the first electronic device 100 (e.g., in response to the first request REQ1), the second electronic device 200 may transmit the first link information L_INF2 associated with the second communication link LNK2 to the first electronic device 100 (S240), and the first electronic device 100 may receive the first link information L_INF2 associated with the second communication link LNK2.

After all of S210 and S240 are performed, a condition for performing S300 in FIG. 1 may be satisfied.

Referring to FIGS. 1, 7 and 8, when detecting and notifying the theft and/or loss of the plurality of electronic devices by sniffing the communication packets exchanged between the plurality of electronic devices (S300), the second electronic device 200 and the third electronic device 300 may exchange a first communication packet PKT1 based on the second communication link LNK2 (S310). Based on S310, the third electronic device 300 may perform an intrinsic function, for example, functions such as audio streaming, data exchange, and message notification. For example, the first communication packet PKT1 may be transmitted from the second electronic device 200 to the third electronic device 300 or from the third electronic device 300 to the second electronic device 200.

In some example embodiments, the second electronic device 200 and the third electronic device 300 may exchange the first communication packet PKT1 using the first link information L_INF2 associated with the second communication link LNK2 obtained in S120 in FIG. 5. For example, the first communication packet PKT1 may be exchanged using the communication address information included in the first link information L_INF2, the second electronic device 200 may encrypt the first communication packet PKT1 using the link key information included in the first link information L_INF2 and may transmit the encrypted first communication packet to the third electronic device 300, and the third electronic device 300 may receive the encrypted first communication packet and may decrypt the encrypted first communication packet using the link key information included in the first link information L_INF2 to obtain the first communication packet PKT1.

While the second electronic device 200 and the third electronic device 300 exchange the first communication packet PKT1, the first electronic device 100 may sniff the first communication packet PKT1, which is exchanged between the second electronic device 200 and the third electronic device 300, based on the first link information L_INF2 (S340). For example, S340 may be periodically performed.

In some example embodiments, the first electronic device 100 may sniff the first communication packet PKT1 using the first link information L_INF2 associated with the second communication link LNK2 obtained in S240 in FIG. 6. For example, the first electronic device 100 may receive the encrypted first communication packet transmitted from the second electronic device 200, and may decrypt the encrypted first communication packet using the link key information included in the first link information L_INF2 to obtain the first communication packet PKT1.

The first electronic device 100 may generate a first notification signal NS1 by detecting a theft and/or loss of the third electronic device 300 based on the sniffed first communication packet SPKT1 (S370). For example, the first electronic device 100 may perform a first theft/loss determination operation DT1 and a first theft/loss notification operation NT1 for the third electronic device 300, may generate the first notification signal NS1 based on the first theft/loss determination operation DT1 and the first theft/loss notification operation NT1, and may provide the first notification signal NS1 to the user. Various schemes of generating the first notification signal NS1 will be described with reference to FIGS. 10, 11 and 12.

In some example embodiments, the first electronic device 100 may perform the first theft/loss determination operation DT1 based on the contents and/or signal strength of the sniffed first communication packet SPKT1.

For example, the first electronic device 100 may perform the theft/loss detection by tracking connection status information (e.g., keep-alive information) of the third electronic device 300 included in the contents of the sniffed first communication packet SPKT1, and by checking based on the connection status information whether the second electronic device 200 and the third electronic device 300 are normally connected.

For example, the first electronic device 100 may perform the theft/loss detection by tracking abnormal status information of an intrinsic function packet of the third electronic device 300 (e.g., an abnormal loss in audio streaming, data exchange, message notification, etc.) included in the contents of the sniffed first communication packet SPKT1, and by checking based on the abnormal status information whether the second electronic device 200 and the third electronic device 300 are normally connected.

For example, the first electronic device 100 may perform the theft/loss detection by tracking the signal strength of the sniffed first communication packet SPKT1, and by checking whether the signal strength is continuously lowered or has fallen below a predetermined reference value.

For example, the first electronic device 100 may track the signal strength of the sniffed first communication packet SPKT1 based on received signal strength indication (RSSI) algorithm. For example, an RSSI calibration (or correction or compensation) tutorial may be provided to improve or enhance the accuracy of tracking the signal strength. For example, when sniffing for the third electronic device 300 starts, a tutorial start notification may be provided to the user. For example, when the user and the third electronic device 300 are separated from each other by about one meter, and when a tutorial start button of the first electronic device 100 is pressed, a setting value may be automatically calibrated for about five seconds. For example, in the RSSI calibration tutorial, RSSI values may be collected for about five seconds, collected RSSI values may be averaged, and the calibration may be performed on the measured power and the number N based on Equation "Distance=10^((Measured Power-RSSI)/(10*N))".

As described above, the accuracy of the theft/loss detection may be improved or enhanced by performing the first theft/loss determination operation DT1 based on the contents and/or signal strength of the sniffed first communication packet SPKT1.

In some example embodiments, the first notification signal NS1 may be provided to the user based on various manners. For example, the first notification signal NS1 may include a visual signal using a light emitting diode (LED) or a screen included in the first electronic device 100, an auditory signal using a speaker included in the first electronic device 100, a vibration signal using a vibration motor included in the first electronic device 100, and/or the like.

The user may recognize the theft and/or loss of the third electronic device 300 based on the first notification signal NS1.

Although not illustrated in FIG. 8, the first electronic device 100 and the second electronic device 200 may also exchange a communication packet based on the first communication link LNK1, and the first electronic device 100 may perform an intrinsic function based on the operation of exchanging the communication packet.

Figure 9:
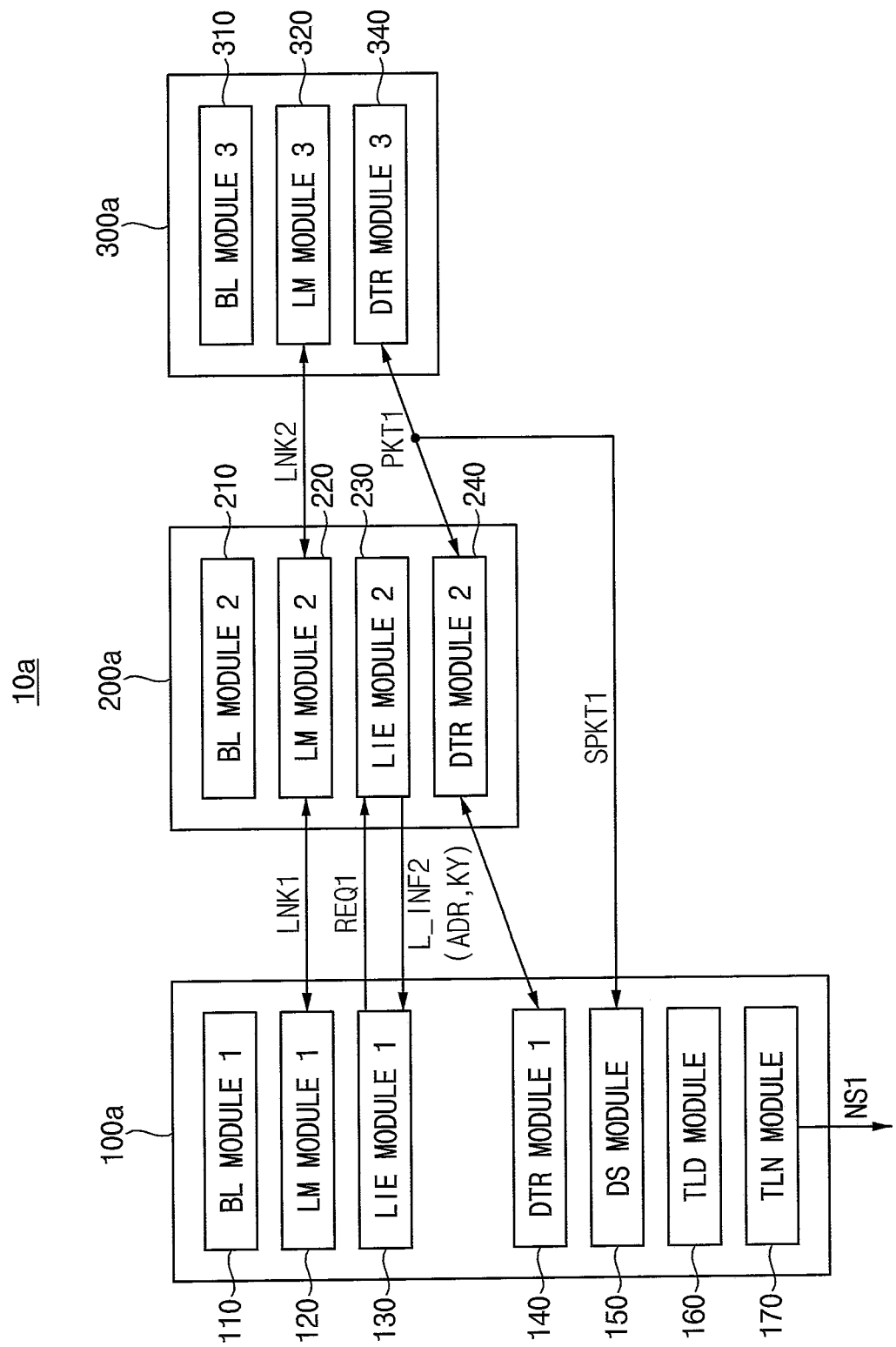
FIG. 9 is a block diagram illustrating an example of a status detection and notification system of FIG. 2.

FIG. 9 is a block diagram illustrating an example of a theft/loss detection and notification system of FIG. 2.

Referring to FIG. 9, a theft/loss detection and notification system 10a may include a first electronic device 100a, a second electronic device 200a and a third electronic device 300a. The theft/loss detection and notification system 10a may be implemented to perform the operations described with reference to FIGS. 5, 6, 7 and 8.

The first electronic device 100a may include a first Bluetooth (BT) module 110, a first link management (LE) module 120, a first link information exchange (LIE) module 130, a first data transmission/reception (DTR) module 140, a data sniffing (DS) module 150, a theft/loss determination (TLD) module 160, and a theft/loss notification (TLN) module 170. The second electronic device 200a may include a second Bluetooth (BT) module 210, a second link management (LE) module 220, a second link information exchange (LIE) module 230, and a second data transmission/reception (DTR) module 240. The third electronic device 300a may include a third Bluetooth (BL) module 310, a third link management (LM) module 320, and a third data transmission/reception (DTR) module 340. The components of the first electronic device 100a, the second electronic device 200a and the third electronic device 300a may be replaced with other components, or additional components may be added.

First, S100 in FIGS. 1 and S110 and S120 in FIG. 5 may be performed using the Bluetooth modules 110, 210 and 310 and the link management modules 120, 220 and 320.

For example, the first electronic device 100a and the second electronic device 200a may be connected based on the Bluetooth. For example, using the first Bluetooth module 110, the second Bluetooth module 210, the first link management module 120 and the second link management module 220, the first electronic device 100a and the second electronic device 200a may be paired with each other, and the first communication link LNK1 may be established between the first electronic device 100a and the second electronic device 200a.

Similarly, the second electronic device 200a and the third electronic device 300a may be connected based on the Bluetooth. For example, using the second Bluetooth module 210, the third Bluetooth module 310, the second link management module 220 and the third link management module 320, the second electronic device 200a and the third electronic device 300a may be paired with each other, and the second communication link LNK2 may be established between the second electronic device 200a and the third electronic device 300a.

Next, S200 in FIGS. 1 and S210 and S240 in FIG. 6 may be performed using the link information exchange modules 130 and 230.

For example, using the first link information exchange module 130, the first electronic device 100a may request the first link information L_INF2 associated with the second communication link LNK2 to the second electronic device 200a. For example, the first link information exchange module 130 may generate the first request REQ1 requesting the first link information L_INF2, and may transmit the first request REQ1 to the second electronic device 200.

In addition, using the second link information exchange module 230, the second electronic device 200*a* may transmit the first link information L_INF2 associated with the second communication link LNK2 to the first electronic device 100*a*. For example, the first link information L_INF2 may include communication address information ADR between the second electronic device 200*a* and the third electronic device 300*a*, and link key information KY related to encrypting and decrypting the first communication packet PKT1. For example, the first link information exchange module 130 may receive the first link information L_INF2, and may transmit the first link information L_INF2 to the data sniffing module 150 of the first electronic device 100*a*.

Thereafter, S300 in FIGS. 1 and S310, S340 and S370 in FIG. 7 may be performed using the data transmission/reception modules 140, 240 and 340, the data sniffing module 150, the theft/loss determination module 160 and the theft/loss notification module 170.

For example, using the first data transmission/reception module 140 the second data transmission/reception module 240 and the first communication link LNK1, the first electronic device 100*a* and the second electronic device 200*a* may communicate with each other. Thus, the first electronic device 100*a* may perform the intrinsic function.

Similarly, using the second data transmission/reception module 240, the third data transmission/reception module 340 and the second communication link LNK2, the second electronic device 200*a* and the third electronic device 300*a* may communicate with each other and may exchange the first communication packet PKT1. Thus, the third electronic device 300*a* may perform the intrinsic function.

While the second electronic device 200*a* and the third electronic device 300*a* exchange the first communication packet PKT1, using the data sniffing module 150 and the link key information KY that is included in the first link information L_INF2 and is related to encrypting and decrypting the first communication packet PKT1, the first electronic device 100*a* may sniff the first communication packet PKT1 exchanged between the second electronic device 200*a* and the third electronic device 300*a* without establishing a communication link between the first electronic device 100*a* and the third electronic device 300*a*. For example, using the first link information L_INF2 received at the first link information exchange module 130, the data sniffing module 150 may sniff the first communication packet (e.g., a Bluetooth wireless communication packet) PKT1 between the second data transmission/reception module 240 of the second electronic device 200*a* and the third data transmission/reception module 340 of the third electronic device 300*a*, and may transmit the contents and signal strength of the sniffed first communication packet SPKT1 to the theft/loss determination module 160.

In addition, using the theft/loss determination module 160, the theft/loss notification module 170 and the sniffed first communication packet SPKT1, the first electronic device 100*a* may generate the first notification signal NS1 by detecting the theft and/or loss of the third electronic device 300*a*. For example, when the theft and/or loss of the third electronic device 300*a* is detected, the theft/loss determination module 160 may transmit a first notification request to the theft/loss notification module 170, the first notification request may include information of the third electronic device 300*a* of which the theft and/or loss is detected, and the theft/loss notification module 170 may generate the first notification signal NS1 based on the first notification request.

In some example embodiments, when it is determined that the connection between the second electronic device 200*a* and the third electronic device 300*a* is normally terminated by analyzing the sniffed first communication packet SPKT1, the first electronic device 100*a* may automatically stop the theft/loss tracking (or theft/loss detection and notification operation) with respect to a target device, e.g., the third electronic device 300*a*, and thus may prevent unnecessary notification signals from being generated.

In some example embodiments, each of the Bluetooth modules 110, 210 and 310, the link management modules 120, 220 and 320, the link information exchange modules 130 and 230, the data transmission/reception modules 140, 240 and 340, the data sniffing module 150, the theft/loss determination module 160 and the theft/loss notification module 170 may be included in at least one of the system-on-chip 2100, the memory device 2200 and the communication module 2400 in FIG. 4 in a corresponding electronic device.

In some example embodiments, at least a part of the Bluetooth modules 110, 210 and 310, the link management modules 120, 220 and 320, the link information exchange modules 130 and 230, the data transmission/reception modules 140, 240 and 340, the data sniffing module 150, the theft/loss determination module 160 and the theft/loss notification module 170 may be implemented as hardware. For example, at least a part of the Bluetooth modules 110, 210 and 310, the link management modules 120, 220 and 320, the link information exchange modules 130 and 230, the data transmission/reception modules 140, 240 and 340, the data sniffing module 150, the theft/loss determination module 160 and the theft/loss notification module 170 may be included in a computer-based electronic system. In other example embodiments, at least a part of the Bluetooth modules 110, 210 and 310, the link management modules 120, 220 and 320, the link information exchange modules 130 and 230, the data transmission/reception modules 140, 240 and 340, the data sniffing module 150, the theft/loss determination module 160 and the theft/loss notification module 170 may be implemented as instruction codes or program routines (e.g., a software program). For example, the instruction codes or the program routines may be executed by a computer-based electronic system, and may be stored in any storage device located inside or outside the computer-based electronic system.

Figure 10:
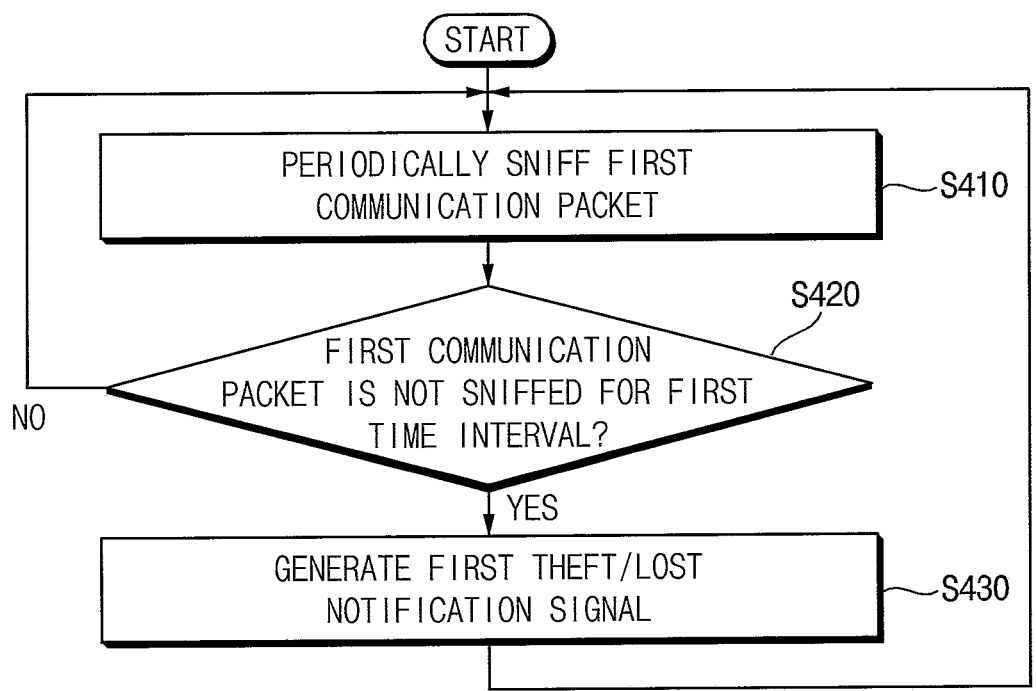
FIGS. 10, 11 and 12 are flowcharts illustrating examples of generating a first notification signal in FIG. 7.
Figure 11:
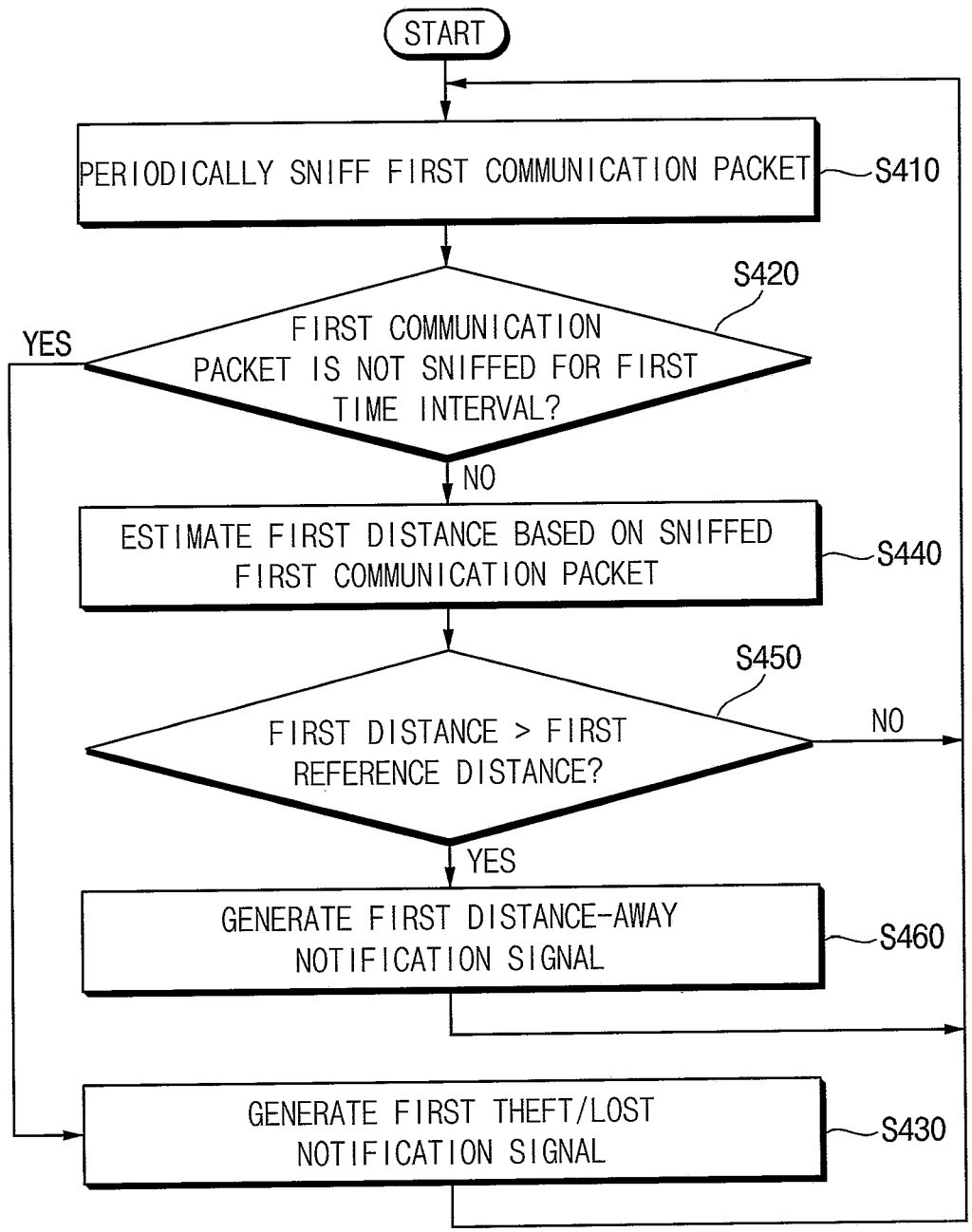
Figure 12:
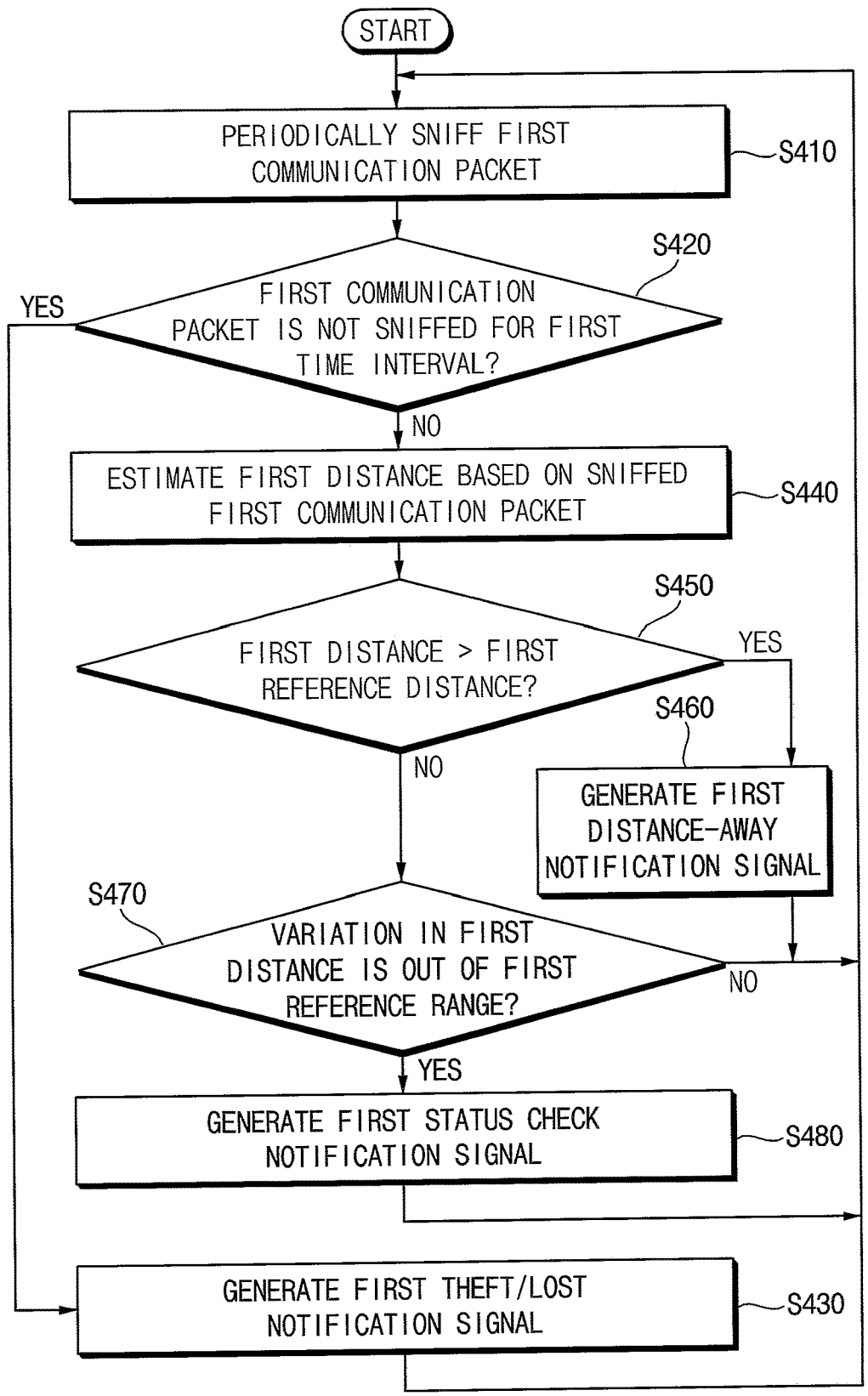

FIGS. 10, 11 and 12 are flowcharts illustrating examples of generating a first notification signal in FIG. 7.

Referring to FIGS. 7, 8 and 10, when sniffing the first communication packet PKT1 before the first notification signal NS1 is generated (S340), the first electronic device 100 may periodically sniff the first communication packet PKT1 (S410).

When generating the first notification signal NS1 by detecting the theft and/or loss of the third electronic device 300 based on the sniffed first communication packet SPKT1 (S370), when it is determined that the first communication packet PKT1 is not sniffed for a first time interval (S420: YES), a first theft/loss notification signal may be generated (S430). For example, when the sniffed first communication packet SPKT1 is not received from the third electronic device 300 for more than the first time interval that is a predetermined time interval, and/or when the link loss or connection timeout occurs on the sniffed first communication packet SPKT1 without normal link termination, the first theft/loss notification signal may be generated.

In some example embodiments, the first time interval may be changeable based on a first user setting signal. In addition, the operation of generating the first theft/loss notification signal may be enabled or disabled (e.g., activated or deactivated) based on the first user setting signal. In other words, to prevent unnecessary notifications from continuously occurring, the first time interval and/or the operation of generating the first theft/loss notification signal may be controlled by a user setting.

When the first communication packet PKT1 is sniffed within the first time interval (S420: NO), the first theft/loss notification signal may not be generated. For example, when two communication packets are sniffed at a first time point and a second time point and when a time interval between the first and second time points are shorter than the first time interval, the first theft/loss notification signal may not be generated.

In addition, since S410 is periodically and repeatedly performed, S420 and S430 may also be periodically and repeatedly performed.

Referring to FIGS. 7, 8 and 11, S410, S420 and S430 in FIG. 11 may be substantially the same as S410, S420 and S430 in FIG. 10, respectively.

When generating the first notification signal NS1 by detecting the theft and/or loss of the third electronic device 300 based on the sniffed first communication packet SPKT1 (S370), when it is determined that the first communication packet PKT1 is sniffed within the first time interval (S420: NO), a first distance between the second electronic device 200 and the third electronic device 300 may be estimated or predicted based on the sniffed first communication packet SPKT1 (S440). For example, the first distance may be estimated by tracking the signal strength of the sniffed first communication packet SPKT1. For example, the signal strength of the sniffed first communication packet SPKT1 may be tracked based on the RSSI algorithm.

When the first distance becomes longer than a first reference distance (S450: YES), a first distance-away notification signal may be generated (S460). For example, when the first distance between the second electronic device 200 and the third electronic device 300, which is estimated based on the RSSI value of the sniffed first communication packet SPKT1, is continuously increased and is out of the first reference distance that is a predetermined distance, the first distance-away notification signal may be generated.

In some example embodiments, the first reference distance may be changeable based on a second user setting signal. In addition, the operation of generating the first distance-away notification signal may be enabled or disabled based on the second user setting signal. In other words, to prevent unnecessary notifications from continuously occurring, the first reference distance and/or the operation of generating the first distance-away notification signal may be controlled by a user setting.

When the first distance is shorter than or equal to the first reference distance (S450: NO), the first distance-away notification signal may not be generated.

In addition, since S410 is periodically and repeatedly performed, S420, S430, S440, S450 and S460 may also be periodically and repeatedly performed.

Referring to FIGS. 7, 8 and 12, S410, S420 and S430 in FIG. 12 may be substantially the same as S410, S420 and S430 in FIG. 10, respectively, and S440, S450 and S460 in FIG. 12 may be substantially the same as S440, S450 and S460 in FIG. 11, respectively.

When generating the first notification signal NS1 by detecting the theft and/or loss of the third electronic device 300 based on the sniffed first communication packet SPKT1 (S370), when the first distance is shorter than or equal to the first reference distance (S450: NO), and when a variation (or change) in the first distance is out of a first reference range (S470: YES), a first status check notification signal may be generated (S480). For example, when the noise is continuously generated on the estimated first distance between the second electronic device 200 and the third electronic device 300, which is estimated based on the RSSI value of the sniffed first communication packet SPKT1, and thus when the estimated first distance randomly deviates from the first reference range that is a predetermined distance range due to the noise, the first status check notification signal may be generated.

In some example embodiments, the operation of generating the first status check notification signal may be enabled or disabled based on a third user setting signal. In other words, to prevent unnecessary notifications from continuously occurring, the first reference range and/or the operation of generating the first status check notification signal may be controlled by a user setting.

When the variation in the first distance is within the first reference range (S470: NO), the first status check notification signal may not be generated.

In addition, since S410 is periodically and repeatedly performed, S420, S430, S440, S450, S460, S470 and S480 may also be periodically and repeatedly performed.

In the example of FIG. 10, the first notification signal NS1 may include the first theft/loss notification signal. In the example of FIG. 11, the first notification signal NS1 may include the first theft/loss notification signal and the first distance-away notification signal. In the example of FIG. 12, the first notification signal NS1 may include the first theft/loss notification signal, the first distance-away notification signal and the first status check notification signal. In other words, the first notification signal NS1 may include at least one of the first theft/loss notification signal, the first distance-away notification signal and the first status check notification signal.

In some example embodiments, the first status check notification signal may correspond to a notification of a lowest level (or priority), the first distance-away notification signal may correspond to a notification of a middle level, and the first theft/loss notification signal may correspond to a notification of a highest level. For example, when the first notification signal NS1 is provided in the form of a visual signal, an auditory signal or a vibration signal, the first status check notification signal may be implemented such that the luminance is the darkest, the sound is the smallest or the vibration is the weakest, and the first theft/loss notification signal may be implemented such that the luminance is the brightest, the sound is the loudest or the vibration is the strongest. In some embodiments, a notification level of each type of notification may be determined according to a user setting or the theft/loss detection and notification system. In some embodiments, each notification type (e.g., status check notification, distance-away notification, and theft/loss notification) may be of the same level and the same or similar notification signal (e.g., same or similar intensity of alarm or notification) may be generated according to each notification type.

Figure 13:
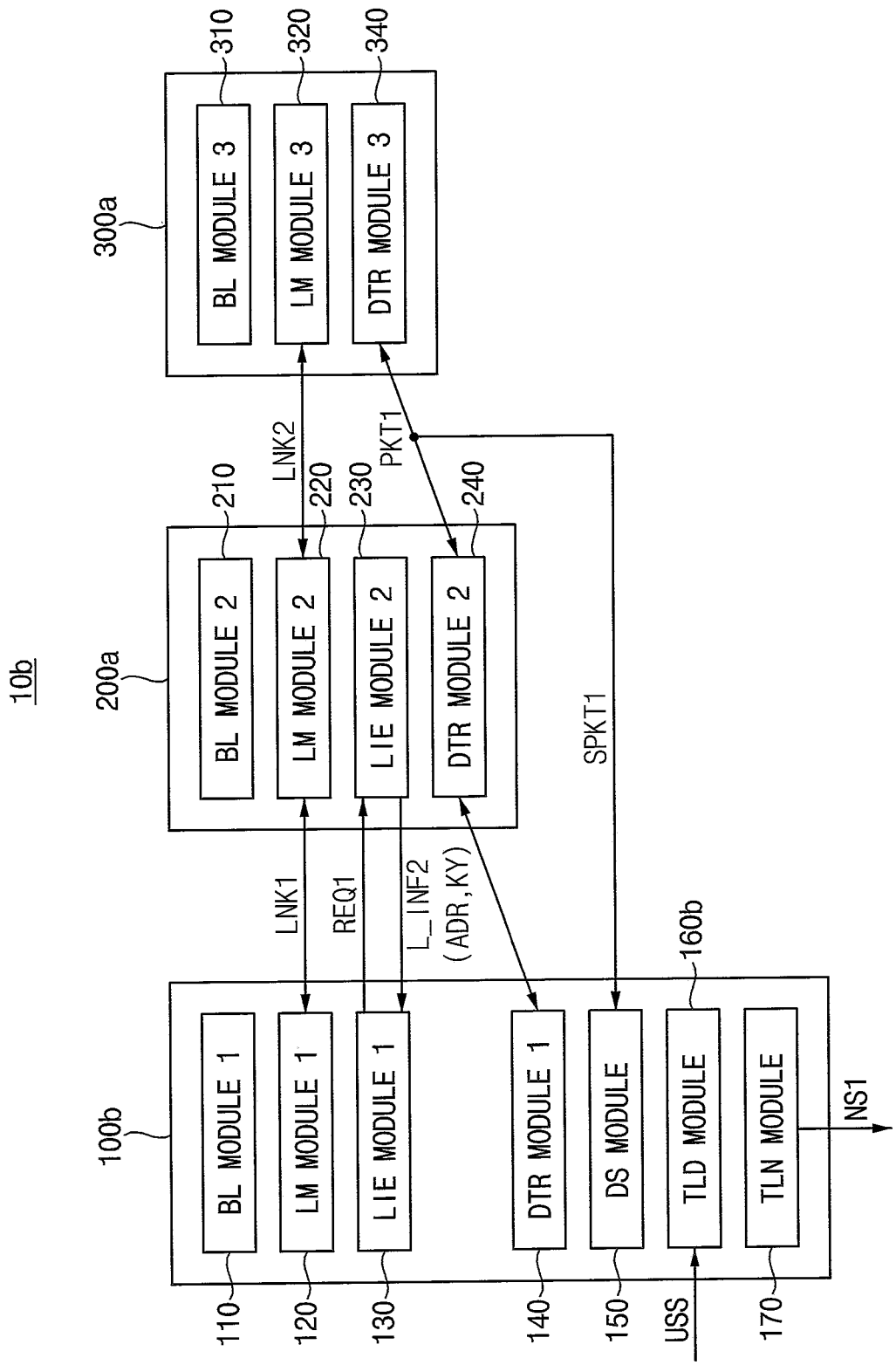
FIG. 13 is a block diagram illustrating an example of a status detection and notification system of FIG. 2.

FIG. 13 is a block diagram illustrating an example of a theft/loss detection and notification system of FIG. 2. The descriptions repeated with FIG. 9 will be omitted.

Referring to FIG. 13, a theft/loss detection and notification system 10b may include a first electronic device 100b, a second electronic device 200a and a third electronic device 300a.

The theft/loss detection and notification system 10b may be substantially the same as the theft/loss detection and notification system 10a of FIG. 9, except that a configuration of a theft/loss determination module 160b included in the first electronic device 100b is partially changed compared to the theft/loss determination module 160.

The theft/loss determination module 160b may receive a user setting signal USS. For example, the user setting signal USS may include at least one of the first user setting signal described with reference to FIG. 10, the second user setting signal described with reference to FIG. 11, and the third user setting signal described with reference to FIG. 12. The theft/loss determination module 160b may control (or adjust) the first time interval and/or the operation of generating the first theft/loss notification signal based on the first user setting signal, may control (or adjust) the first reference distance and/or the operation of generating the first distance-away notification signal based on the second user setting signal, and/or may control (or adjust) the first reference range and/or the operation of generating the first status check notification signal based on the third user setting signal. Although not illustrated in detail, the theft/loss notification module 170 may also receive the user setting signal USS, based on which the operation of generating the theft/loss notification may be controlled.

Figure 14:
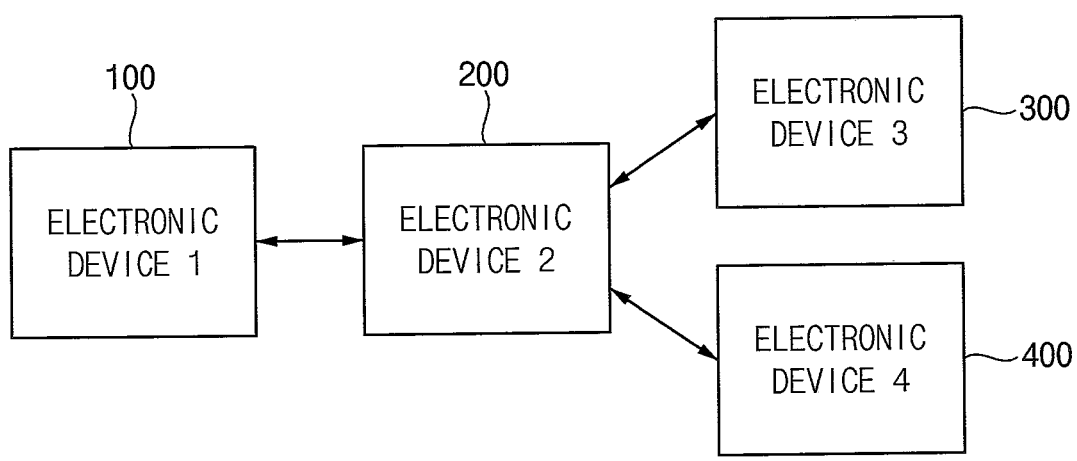
FIG. 14 is a block diagram illustrating a status detection and notification system according to example embodiments.

FIG. 14 is a block diagram illustrating a theft/loss detection and notification system according to example embodiments. The descriptions repeated with FIG. 2 will be omitted.

Referring to FIG. 14, a theft/loss detection and notification system 12 includes a first electronic device 100, a second electronic device 200 and a third electronic device 300. The theft/loss detection and notification system 12 may further include a fourth electronic device 400.

The theft/loss detection and notification system 12 may be substantially the same as the theft/loss detection and notification system 10 of FIG. 2, except that the theft/loss detection and notification system 12 further includes the fourth electronic device 400.

As with the third electronic device 300, the fourth electronic device 400 may also be an electronic device that is a target of the function of detecting and notifying the theft and/or loss. A communication link may be established between the second electronic device 200 and the fourth electronic device 400, and a communication link may not be directly established between the first electronic device 100 and the fourth electronic device 400.

The first electronic device 100 may receive, from the second electronic device 200, link information associated with the communication link that is established between the second electronic device 200 and the fourth electronic device 400, may sniff a communication packet exchanged between the second electronic device 200 and the fourth electronic device 400 based on the link information received from the second electronic device 200, and may generate a notification signal by detecting a theft and/or loss of the fourth electronic device 400 based on the sniffed communication packet.

Figure 15:
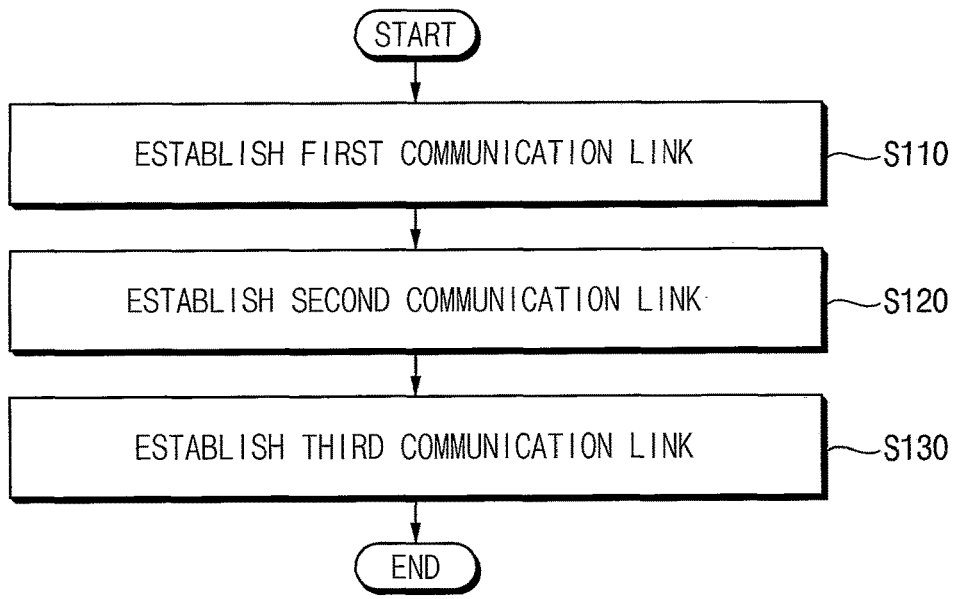
FIG. 15 is a flowchart illustrating an example of establishing communication links in FIG. 1.
Figure 16:
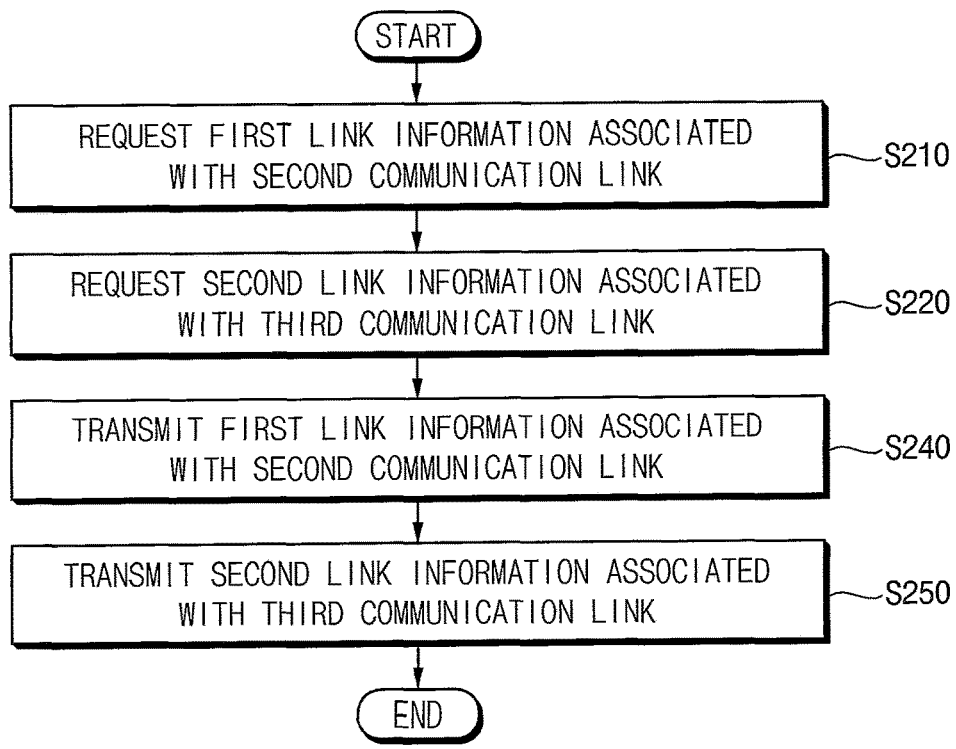
FIG. 16 is a flowchart illustrating an example of exchanging link information in FIG. 1.
Figure 17:
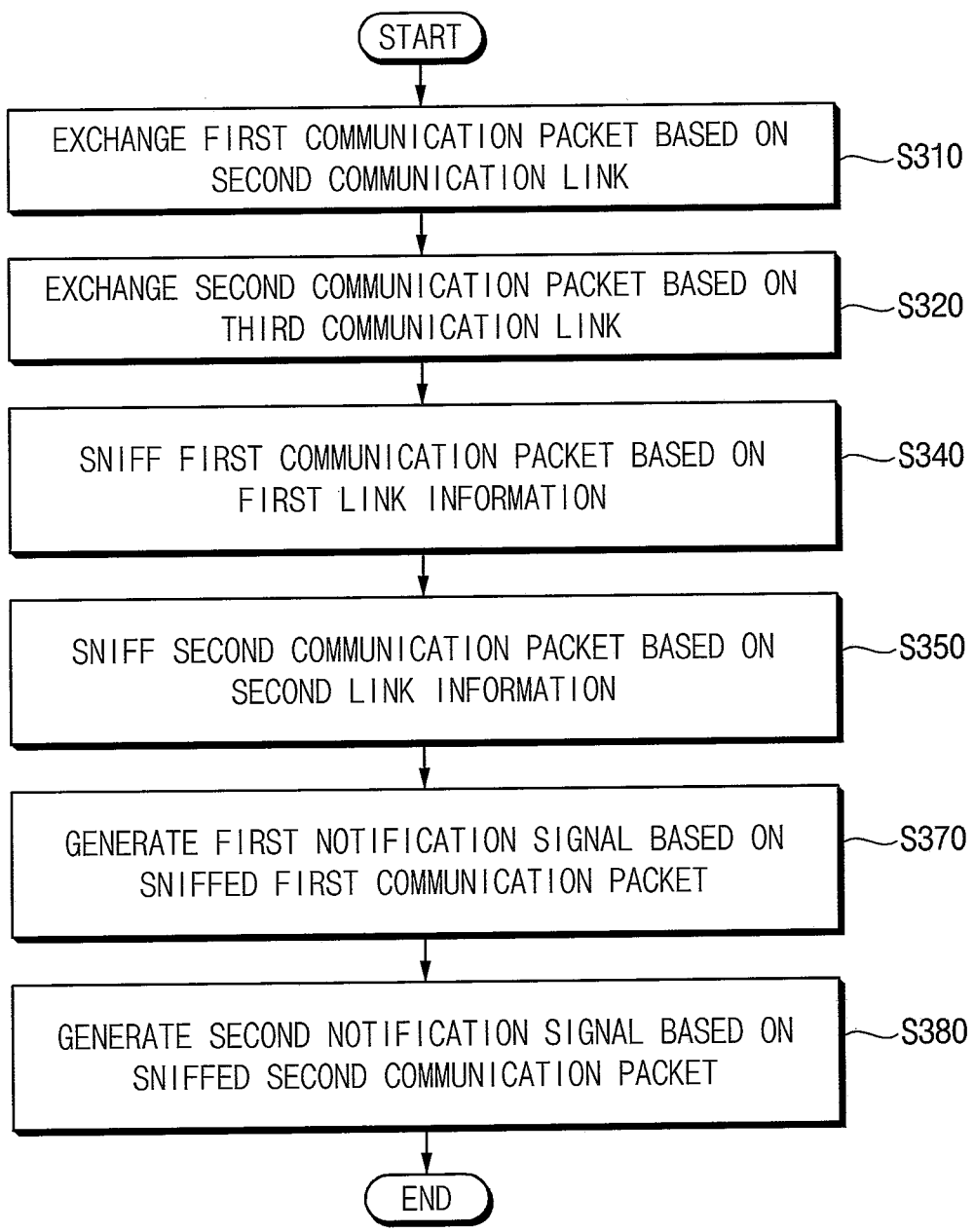
FIG. 17 is a flowchart illustrating an example of detecting and notifying a status in FIG. 1.
Figure 18:
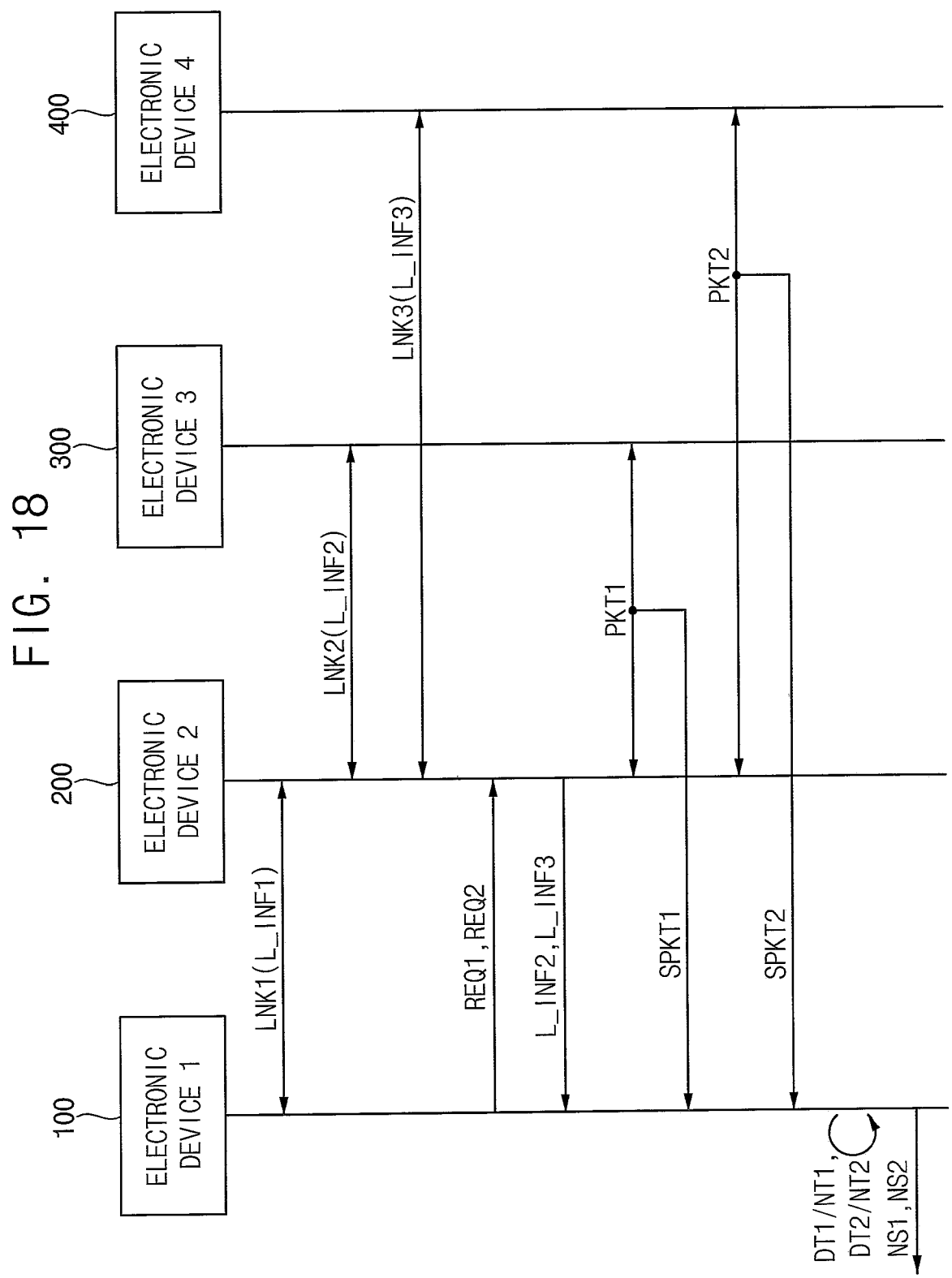
FIG. 18 is a diagram for describing operations of FIGS. 15, 16 and 17.

FIG. 15 is a flowchart illustrating an example of establishing communication links in FIG. 1. FIG. 16 is a flowchart illustrating an example of exchanging link information in FIG. 1. FIG. 17 is a flowchart illustrating an example of detecting and notifying theft and/or loss in FIG. 1. FIG. 18 is a diagram for describing operations of FIGS. 15, 16 and 17. The descriptions repeated with FIGS. 5, 6, 7 and 8 will be omitted.

Referring to FIGS. 1, 15 and 18, when establishing the communication links between the plurality of electronic devices (S100), S110 and S120 in FIG. 15 may be substantially the same as S110 and S120 in FIG. 5, respectively.

A third communication link LNK3 may be established between the second electronic device 200 and the fourth electronic device 400 (S130). Operation S130 may be similar to S110 and S120 in FIG. 5. For example, the second electronic device 200 may transmit a communication link establishment request to the fourth electronic device 400, and/or the fourth electronic device 400 may transmit a communication link establishment request to the second electronic device 200. Based on the communication link establishment request(s), the second electronic device 200 and the fourth electronic device 400 may perform operations related to establishing the third communication link LNK3, e.g., communication address exchange, key generation, key exchange, and/or the like. When the establishment of the third communication link LNK3 is successfully completed, the second electronic device 200 may transmit a communication link establishment completion response to the fourth electronic device 400, and the fourth electronic device 400 may transmit a communication link establishment completion response to the second electronic device 200. For example, the third communication link LNK3 may be established based on the Bluetooth.

Link information L_INF3 associated with the third communication link LNK3 may be generated as a result of establishing the third communication link LNK3. The link information L_INF3 associated with the third communication link LNK3 may be stored and updated in the second electronic device 200 and the fourth electronic device 400. For example, the link information L_INF3 associated with the third communication link LNK3 may include communication address information between the second electronic device 200 and the fourth electronic device 400, and link key information related to encrypting and decrypting communication packets exchanged between the second electronic device 200 and the fourth electronic device 400.

An order of performing S110, S120 and S130 may be variously determined according to example embodiments.

Referring to FIGS. 1, 16 and 18, when exchanging the link information associated with the communication links between the plurality of electronic devices (S200), S210 and S240 in FIG. 16 may be substantially the same as S210 and S240 in FIG. 6, respectively.

The first electronic device 100 may request the link information L_INF3 associated with the third communication link LNK3, which is established between the second electronic device 200 and the fourth electronic device 400, to the second electronic device 200 (S220). Operation S220 may be similar to operation S210. The link information L_INF3 associated with the third communication link LNK3 may be referred to as second link information. For example, the first electronic device 100 may generate a second request REQ2 for the second link information L_INF3 and may transmit the second request REQ2 to the second electronic device 200, and the second electronic device 200 may receive the second request REQ2.

In response to the request from the first electronic device 100 (e.g., in response to the second request REQ2), the second electronic device 200 may transmit the second link information L_INF3 associated with the third communication link LNK3 to the first electronic device 100 (S250), and the first electronic device 100 may receive the second link information L_INF3 associated with the third communication link LNK3. Operation S250 may be similar to operation S240.

Referring to FIGS. 1, 17 and 18, when detecting and notifying the theft and/or loss of the plurality of electronic devices by sniffing the communication packets exchanged between the plurality of electronic devices (S300), S310, S340 and S370 in FIG. 17 may be substantially the same as S310, S340 and S370 in FIG. 7, respectively.

The second electronic device 200 and the fourth electronic device 400 may exchange a second communication packet PKT2 based on the third communication link LNK3 (S320). Based on S320, the fourth electronic device 400 may perform an intrinsic function.

In some example embodiments, the second electronic device 200 and the fourth electronic device 400 may exchange the second communication packet PKT2 using the second link information L_INF3 associated with the third communication link LNK3 obtained in S130 in FIG. 15. For example, the second communication packet PKT2 may be exchanged using the communication address information included in the second link information L_INF3, the second electronic device 200 may encrypt the second communication packet PKT2 using the link key information included in the second link information L_INF3 and may transmit the encrypted second communication packet, and the fourth electronic device 400 may receive the encrypted second communication packet and may decrypt the encrypted second communication packet using the link key information included in the second link information L_INF3 to obtain the second communication packet PKT2.

While the second electronic device 200 and the fourth electronic device 400 exchange the second communication packet PKT2, the first electronic device 100 may sniff the second communication packet PKT2, which is exchanged between the second electronic device 200 and the fourth electronic device 400, based on the second link information L_INF3 (S350). For example, S350 may be periodically performed.

In some example embodiments, the first electronic device 100 may sniff the second communication packet PKT2 using the second link information L_INF3 associated with the third communication link LNK3 obtained in S250 in FIG. 16. For example, the first electronic device 100 may receive the encrypted second communication packet transmitted from the second electronic device 200, and may decrypt the encrypted second communication packet using the link key information included in the second link information L_INF3 to obtain the second communication packet PKT2.

The first electronic device 100 may generate a second notification signal NS2 by detecting a theft and/or loss of the fourth electronic device 400 based on the sniffed second communication packet SPKT2 (S380). Operation S380 may be similar to operation S370. For example, the first electronic device 100 may perform a second theft/loss determination operation DT2 and a second theft/loss notification operation NT2 for the fourth electronic device 400, and may transfer the second notification signal NS2 to the user.

In some example embodiments, the first electronic device 100 may perform the second theft/loss determination operation DT2 based on the contents and/or signal strength of the sniffed second communication packet SPKT2.

In some example embodiments, as with the operations of generating the first notification signal NS1 described with reference to FIGS. 10, 11 and 12, the second notification signal NS2 may be generated in S380. For example, when the second communication packet PKT2 is not sniffed for a second time interval, a second theft/loss notification signal may be generated. For example, a second distance between the second electronic device 200 and the fourth electronic device 400 may be estimated based on the sniffed second communication packet SPKT2, and when the second distance becomes longer than a second reference distance, a second distance-away notification signal may be generated. For example, when the second distance is shorter than or equal to the second reference distance, and when a variation in the second distance is out of a second reference range, a second status check notification signal may be generated. In other words, the second notification signal NS2 may include at least one of the second theft/loss notification signal, the second distance-away notification signal and the second status check notification signal. For example, the second time interval, the second reference distance and the second reference range may be substantially the same as or different from the first time interval, the first reference distance and the first reference range described with reference to FIGS. 10, 11 and 12, respectively. The second time interval, the second reference distance and the second reference range may be determined according to a user setting or the theft/loss detection and notification system.

In some example embodiments, the first electronic device 100, the second electronic device 200 and the third electronic device 300 may be implemented similarly to those described with reference to FIGS. 9 and 13, respectively, and the fourth electronic device 400 may be implemented similarly to the third electronic device 300.

Figure 19:
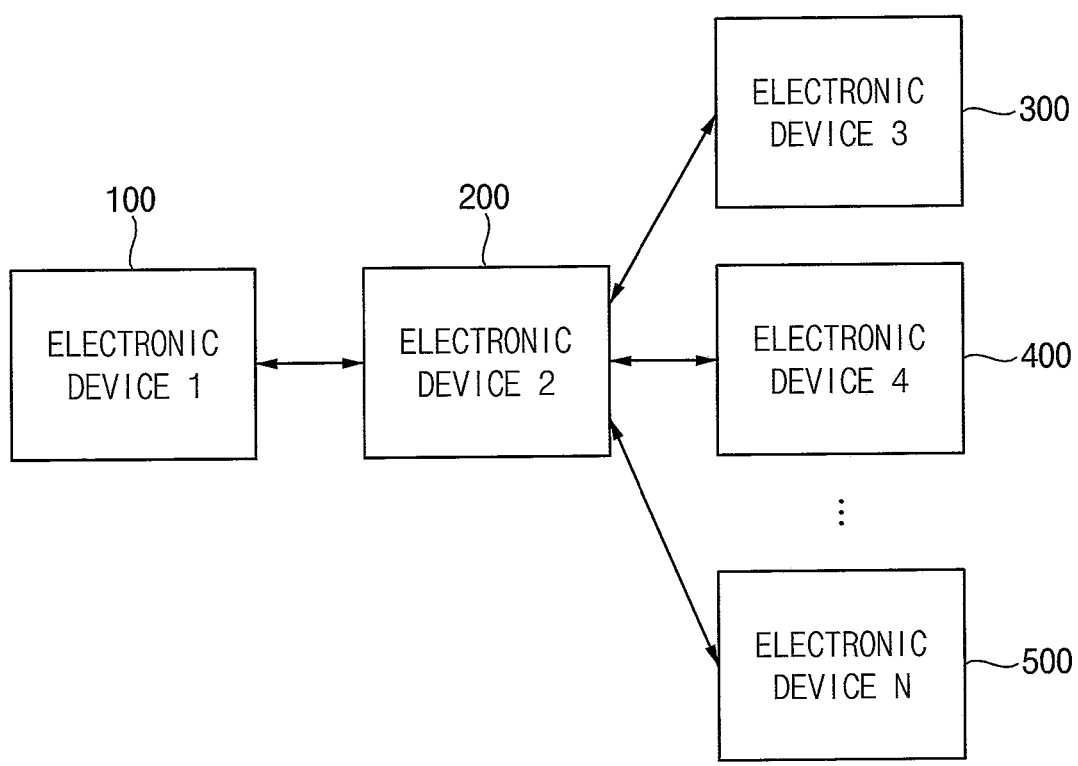
FIG. 19 is a block diagram illustrating a status detection and notification system according to example embodiments.

FIG. 19 is a block diagram illustrating a theft/loss detection and notification system according to example embodiments. The descriptions repeated with FIGS. 2 and 14 will be omitted.

Referring to FIG. 19, a theft/loss detection and notification system 14 includes a first electronic device 100, a second electronic device 200 and a third electronic device 300. The theft/loss detection and notification system 14 may further include a fourth electronic device 400 to an N-th electronic device 500, where N is a natural number greater than or equal to five.

The theft/loss detection and notification system 14 may be substantially the same as the theft/loss detection and notification system 10 of FIG. 2, except that the theft/loss detection and notification system 14 further includes the fourth electronic device 400 to the N-th electronic device 500. The fourth electronic device 400 may be substantially the same as the fourth electronic device 400 in FIG. 14.

As with the third electronic device 300 and the fourth electronic device 400, the N-th electronic device 500 may also be an electronic device that is a target of the function of detecting and notifying the theft and/or loss. A communication link may be established between the second electronic device 200 and the N-th electronic device 500, and a communication link may not be directly established between the first electronic device 100 and the N-th electronic device 500.

The first electronic device 100 may receive link information associated with the communication link that is established between the second electronic device 200 and the N-th electronic device 500 from the second electronic device 200, may sniff a communication packet exchanged between the second electronic device 200 and the N-th electronic device 500 based on the link information received from the second electronic device 200, and may generate a notification signal by detecting a theft and/or loss of the N-th electronic device 500 based on the sniffed communication packet.

Figure 20:
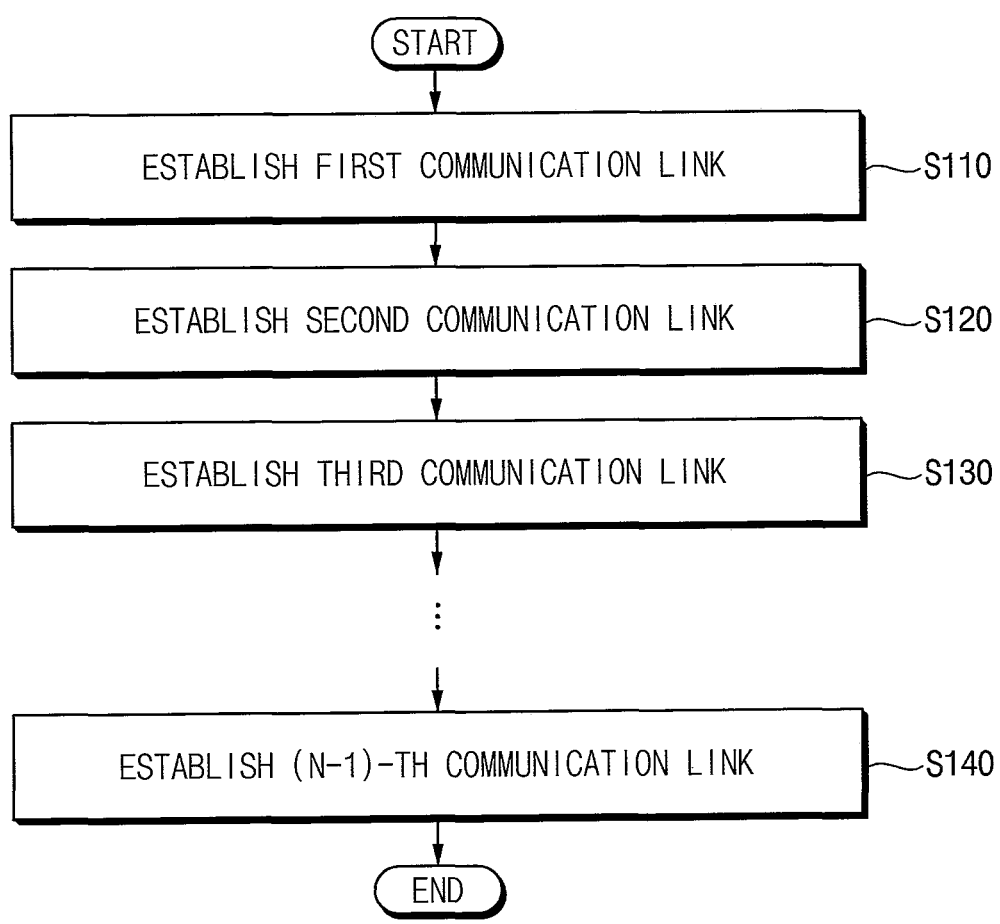
FIG. 20 is a flowchart illustrating an example of establishing communication links in FIG. 1.
Figure 21:
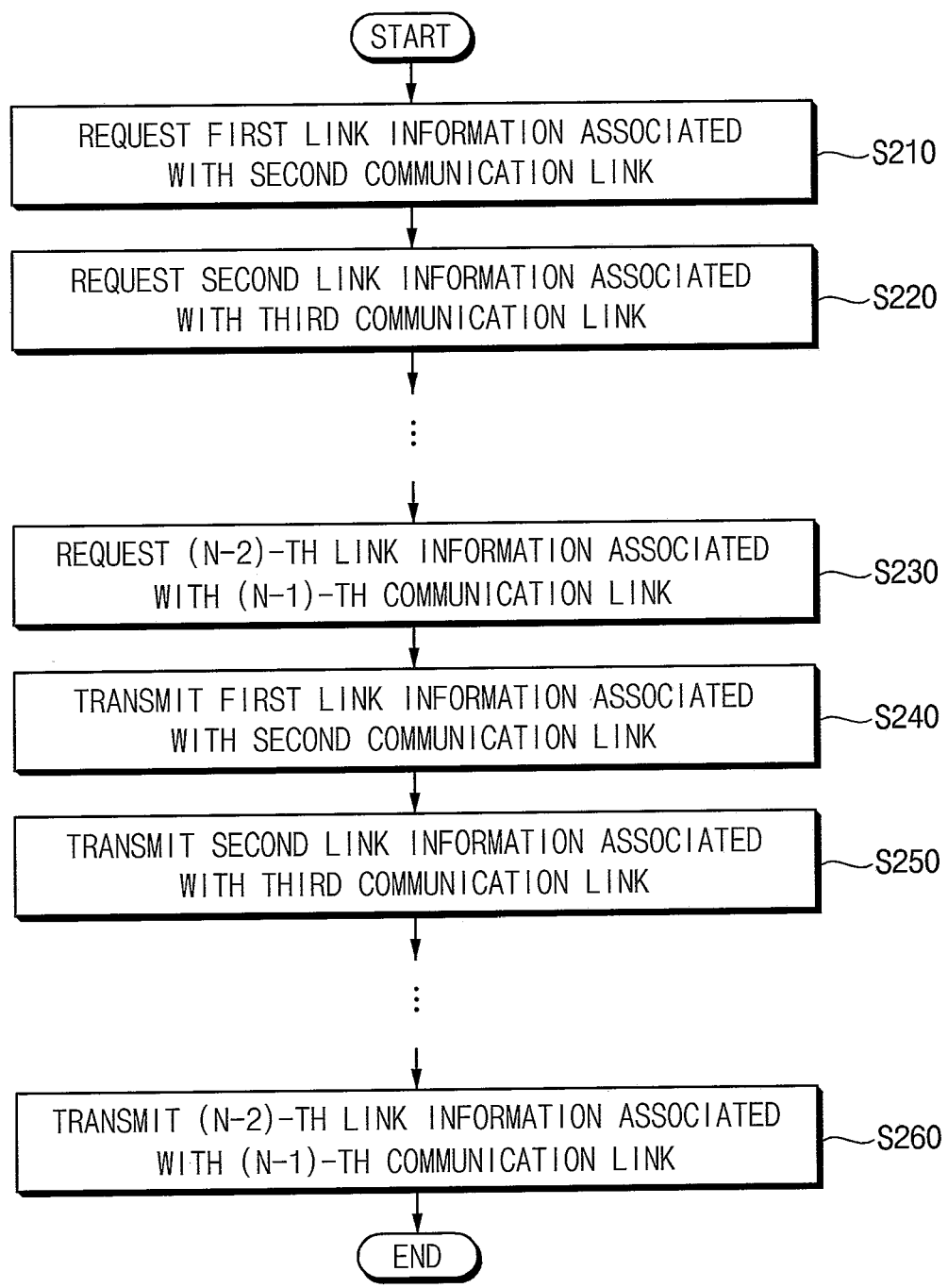
FIG. 21 is a flowchart illustrating an example of exchanging link information in FIG. 1.
Figure 22:
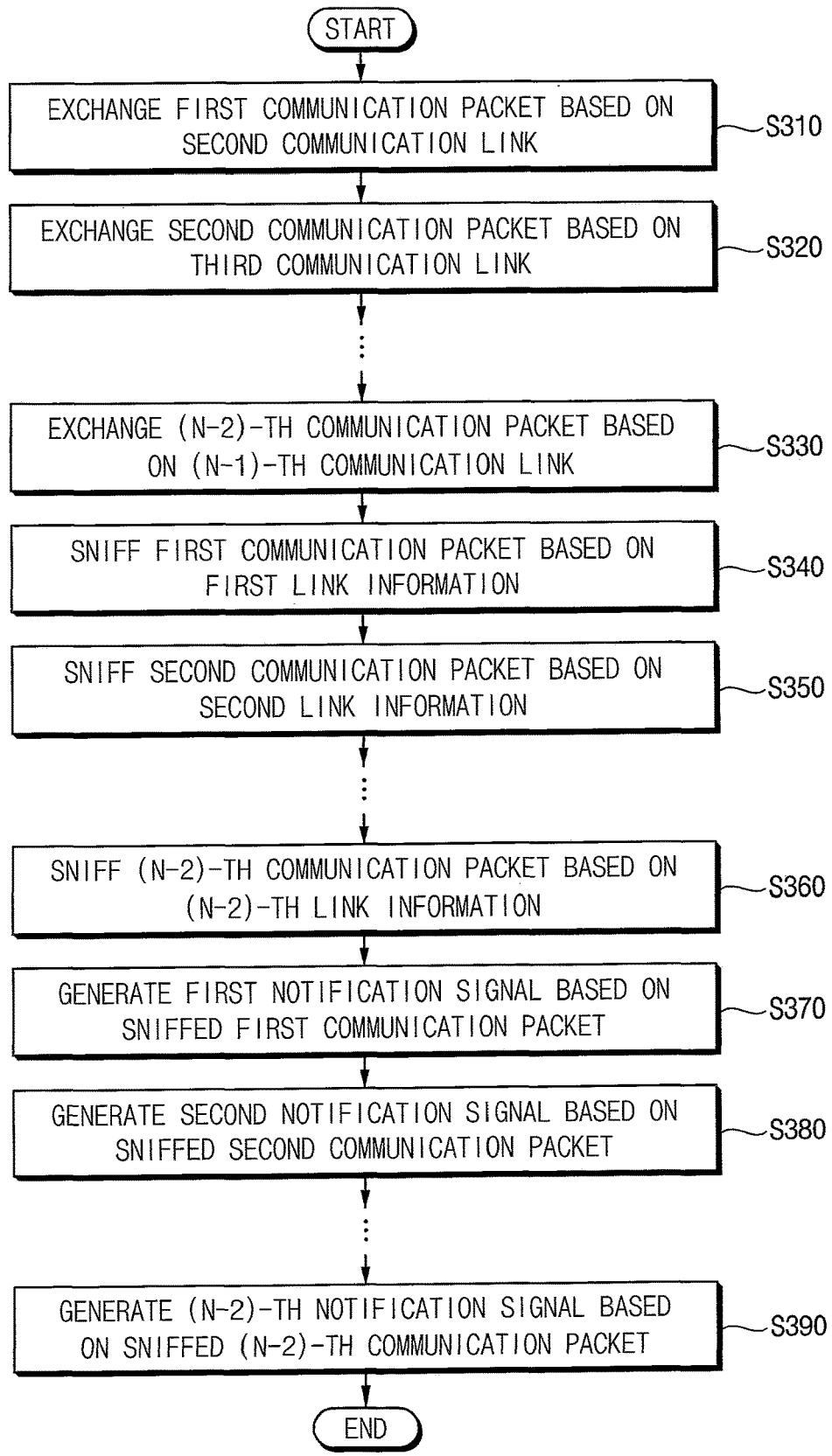
FIG. 22 is a flowchart illustrating an example of detecting and notifying a status in FIG. 1.

FIG. 20 is a flowchart illustrating an example of establishing communication links in FIG. 1. FIG. 21 is a flowchart illustrating an example of exchanging link information in FIG. 1. FIG. 22 is a flowchart illustrating an example of detecting and notifying theft and/or loss in FIG. 1. The descriptions repeated with FIGS. 5, 6, 7, 8, 15, 16, 17 and 18 will be omitted.

Referring to FIGS. 1 and 20, when establishing the communication links between the plurality of electronic devices (S100), S110 and S120 in FIG. 20 may be substantially the same as S110 and S120 in FIG. 5, respectively, and S130 in FIG. 20 may be substantially the same as S130 in FIG. 15.

An (N−1)-th communication link may be established between the second electronic device 200 and the N-th electronic device 500 (S140). Operation S140 may be similar to operations S110, S120 and S130.

Referring to FIGS. 1 and 21, when exchanging the link information associated with the communication links between the plurality of electronic devices (S200), S210 and S240 in FIG. 21 may be substantially the same as S210 and S240 in FIG. 6, respectively, and S220 and S250 in FIG. 21 may be substantially the same as S220 and S250 in FIG. 16, respectively.

The first electronic device 100 may request (N−2)-th link information associated with the (N−1)-th communication link, which is established between the second electronic device 200 and the N-th electronic device 500, to the second electronic device 200 (S230). The second electronic device 200 may transmit the (N−2)-th link information associated with the (N−1)-th communication link to the first electronic device 100 (S260). Operation S230 may be similar to operations S210 and S220, and operation S260 may be similar to operations S240 and S250.

Referring to FIGS. 1 and 22, when detecting and notifying the theft and/or loss of the plurality of electronic devices by sniffing the communication packets exchanged between the plurality of electronic devices (S300), S310, S340 and S370 in FIG. 22 may be substantially the same as S310, S340 and S370 in FIG. 7, respectively, and S320, S350 and S380 in FIG. 22 may be substantially the same as S320, S350 and S380 in FIG. 17, respectively.

The second electronic device 200 and the N-th electronic device 500 may exchange an (N−2)-th communication packet based on the (N−1)-th communication link (S330). While the second electronic device 200 and the N-th electronic device 500 exchange the (N−2)-th communication packet, the first electronic device 100 may sniff the (N−2)-th communication packet, which is exchanged between the second electronic device 200 and the N-th electronic device 500, based on the (N−2)-th link information (S360). The first electronic device 100 may generate an (N−2)-th notification signal by detecting a theft and/or loss of the N-th electronic device 500 based on the sniffed (N−2)-th communication packet (S390). Operation S330 may be similar to operations S310 and S320, operation S360 may be similar to operations S340 and S350, and operation S390 may be similar to operations S370 and S380.

Figure 23:
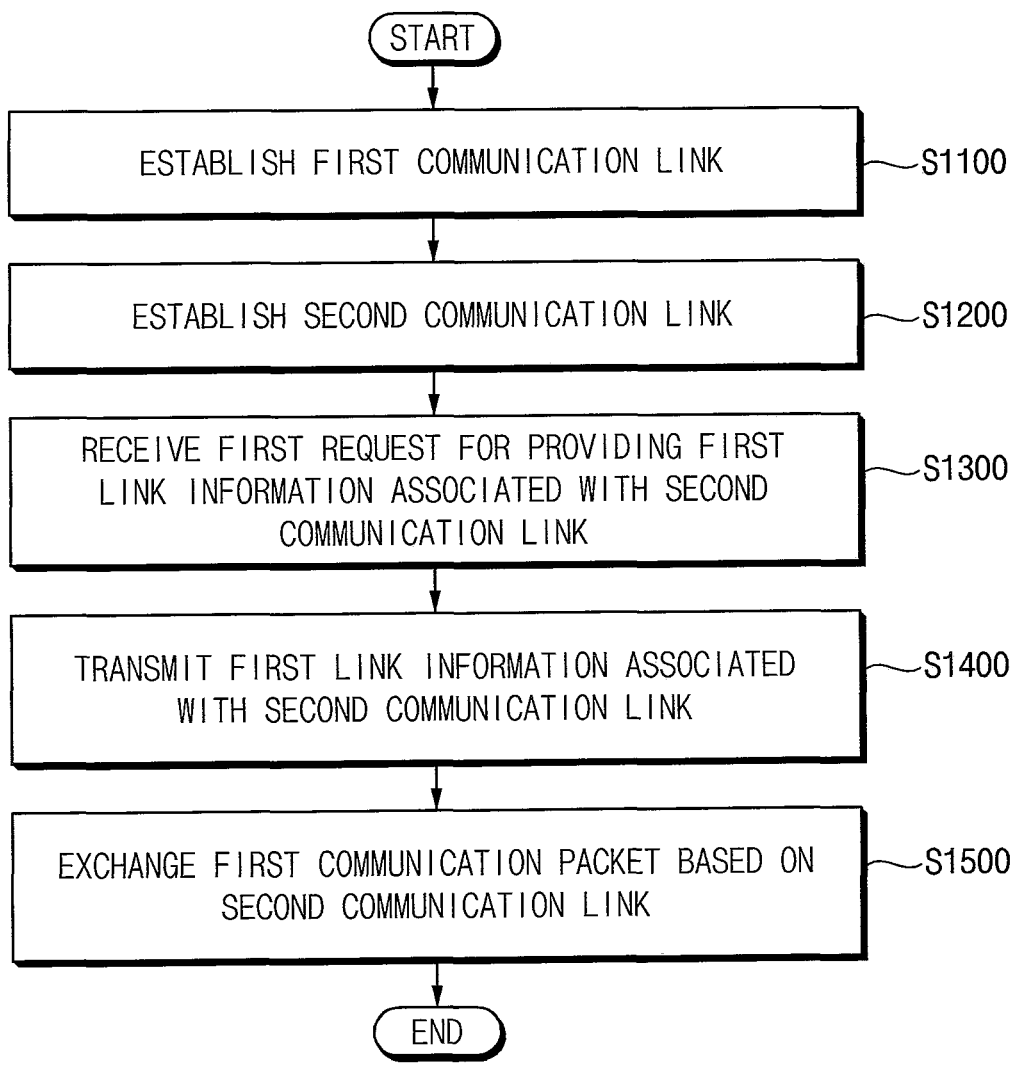
FIGS. 23 and 24 are flowcharts illustrating a method of operating an electronic device according to example embodiments.
Figure 24:
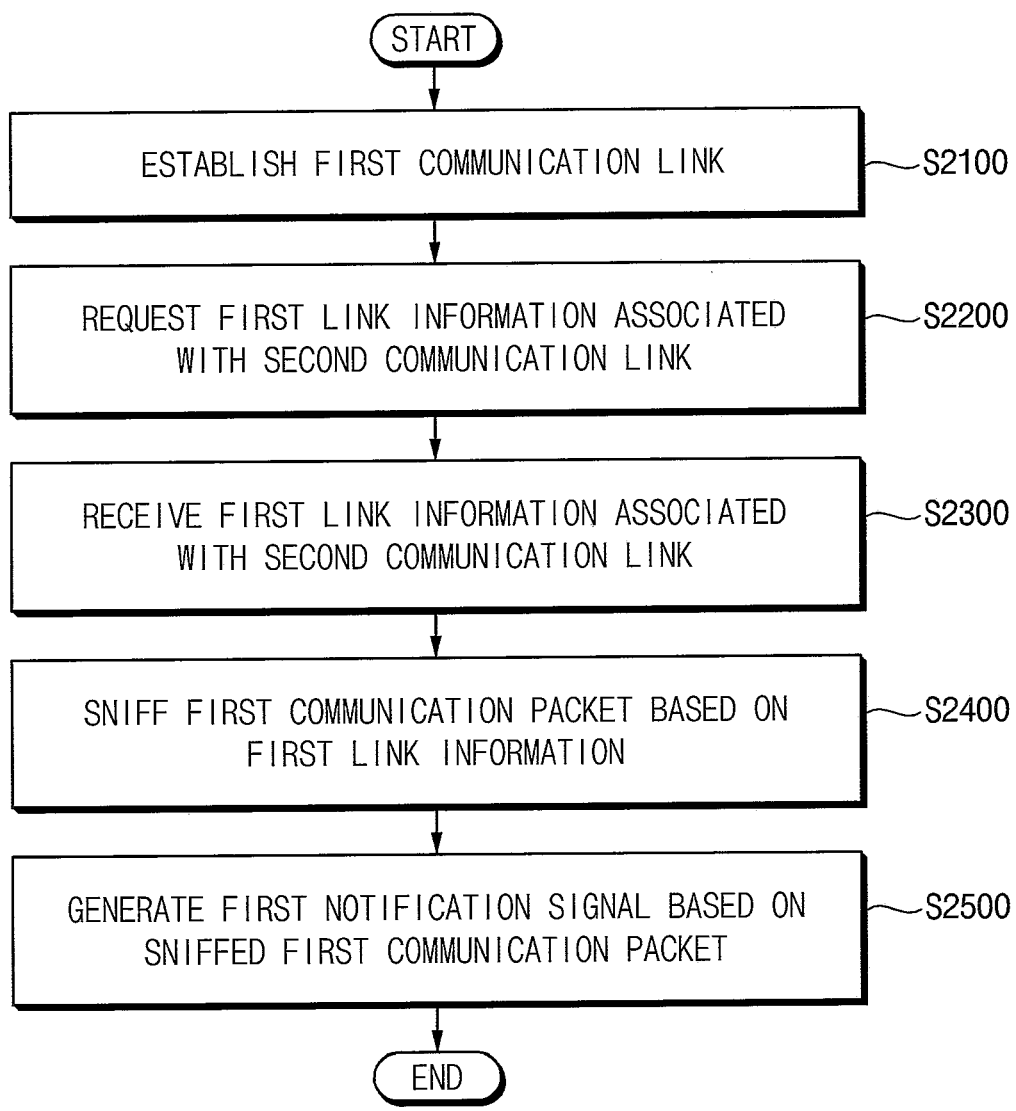

FIGS. 23 and 24 are flowcharts illustrating a method of operating an electronic device according to example embodiments.

Referring to FIG. 23, a method of operating an electronic device according to example embodiments is performed by an electronic device that is included in the theft/loss detection and notification system described with reference to FIGS. 1 through 22 and communicates with all other electronic devices. The electronic device performing the method of FIG. 23 may communicate with a first external electronic device and a second external electronic device, the first external electronic device may be an electronic device that performs a function of detecting and notifying the theft and/or loss of another electronic device, and the second external electronic device may be an electronic device that is a target of the function of detecting and notifying the theft and/or loss. For example, the electronic device performing the method of FIG. 23 may be the second electronic device 200 in FIG. 2, the first external electronic device may be the first electronic device 100 in FIG. 2, and the second external electronic device may be the third electronic device 300 in FIG. 2.

In the method of operating the electronic device according to example embodiments, a first communication link is between the electronic device and the first external electronic device (S1100). A second communication link is established between the electronic device and the second external electronic device (S1200). For example, S1100 and S1200 may correspond to S110 and S120 in FIG. 5, respectively.

The electronic device receives a first request for providing first link information associated with the second communication link from the first external electronic device (S1300). The electronic device transmits the first link information associated with the second communication link to the first external electronic device based on the first request (S1400). For example, S1300 and S1400 may correspond to S210 and S240 in FIG. 6, respectively. For example, the first link information may include communication address information between the electronic device and the second external electronic device, and link key information related to encrypting and decrypting a first communication packet exchanged between the electronic device and the second external electronic device.

The electronic device and the second external electronic device exchange the first communication packet based on the second communication link (S1500). For example, S1500 may correspond to S310 in FIG. 7.

After S1500 is performed, as with S340 and S370 in FIG. 7, the first external electronic device may sniff the first communication packet, which is exchanged between the electronic device and the second external electronic device, based on the first link information, and may generate a first notification signal by detecting a theft and/or loss of the second external electronic device based on the sniffed first communication packet.

Referring to FIG. 24, a method of operating an electronic device according to example embodiments is performed by an electronic device that is included in the theft/loss detection and notification system described with reference to FIGS. 1 through 22 and performs a function of detecting and notifying the theft and/or loss of another electronic device. The electronic device performing the method of FIG. 24 may communicate with a first external electronic device, and the first external electronic device may be an electronic device that communicates with all other electronic devices. In addition, the theft/loss detection and notification system that includes the electronic device performing the method of FIG. 24 and the first external electronic device may further include a second external electronic device, and the second external electronic device may be an electronic device that is a target of the function of detecting and notifying the theft and/or loss. For example, the electronic device performing the method of FIG. 24 may be the first electronic device 100 in FIG. 2, the first external electronic device may be the second electronic device 200 in FIG. 2, and the second external electronic device may be the third electronic device 300 in FIG. 2.

In the method of operating the electronic device according to example embodiments, a first communication link is established between the electronic device and the first external electronic device (S2100). For example, S2100 may correspond to S110 of FIG. 5.

Before S2200 is performed, as with S120 in FIG. 5, a second communication link may be established between the first external electronic device and the second external electronic device.

The electronic device requests first link information associated with the second communication link, which is established between the first external electronic device and the second external electronic device, to the first external electronic device (S2200). The electronic device receives the first link information associated with the second communication link from the first external electronic device (S2300). For example, S2200 and S2300 may correspond to S210 and S240 in FIG. 6, respectively.

Before S2400 is performed, as with S310 in FIG. 7, the first external electronic device and the second external electronic device may exchange a first communication packet based on the second communication link.

The electronic device sniffs the first communication packet exchanged between the first external electronic device and the second external electronic device based on the first link information (S2400). The electronic device generates a first notification signal by detecting a theft and/or loss of the second external electronic device based on the sniffed first communication packet (S2500). For example, S2400 and S2500 may correspond to S340 and S370 in FIG. 7, respectively.

In some example embodiments, the first notification signal may include at least one of a first theft/loss notification signal, a first distance-away notification signal and a first status check notification signal. The first theft/loss notification signal may be generated when the first communication packet is not sniffed for a first time interval. The first distance-away notification signal may be generated when a first distance become longer than a first reference distance, and the first distance between the second electronic device and the third electronic device may be estimated based on the sniffed first communication packet. The first status check notification signal may be generated when the first distance is shorter than or equal to the first reference distance and when a variation in the first distance is out of a first reference range.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

The inventive concept may be applied to various electronic devices and systems with the theft/loss prevention function. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

In the method of operating the theft/loss detection and notification system and the method of operating the electronic device according to example embodiments, the electronic device may efficiently perform the function of detecting and notifying the theft and/or loss of another electronic device based on a sniffing technology, even if the communication link is not directly established between the electronic device that performs the function of detecting and notifying the theft and/or loss and the electronic device that is the target of the function of detecting and notifying the theft and/or loss. Accordingly, the theft/loss detection and notification service may be provided even if the electronic device that is the target of the function of detecting and notifying the theft and/or loss does not support additional technologies and functions. In addition, the theft/loss detection and notification service may be provided while maintaining the quality of service for the original function of the electronic device and/or while reducing energy consumption of the electronic device.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating an electronic device configured to communicate with a first external electronic device, the method comprising:
    transmitting, by the electronic device, a first communication link establishment request to the first external electronic device, the first communication link establishment request being a request for establishing a first communication link between the electronic device and the first external electronic device;
    transmitting, by the electronic device, a first communication link establishment completion response to the first external electronic device, the first communication link establishment completion response representing that an establishment of the first communication link is successfully completed;
    transmitting, by the electronic device, a first request to the first external electronic device, the first request being a request for receiving first link information associated with a second communication link between the first external electronic device and a second external electronic device different from the first external electronic device;
    receiving, by the electronic device, the first link information associated with the second communication link from the first external electronic device, based on the first request;
    sniffing, by the electronic device, a first communication packet based on the first link information, the first communication packet being exchanged between the first external electronic device and the second external electronic device; and
    generating, by the electronic device, a first notification signal based on a condition being met, the condition being met based on the sniffed first communication packet.

2. The method of claim 1, wherein the generating the first notification signal includes:
    generating a first type notification signal, based on the first communication packet not being sniffed for a first time interval.

3. The method of claim 2, wherein:
    the first time interval is changeable based on a first user setting signal, and
    the generating the first type notification signal is enabled or disabled based on the first user setting signal.

4. The method of claim 1, wherein the generating the first notification signal includes:
    estimating a first distance between the first external electronic device and the second external electronic device based on the sniffed first communication packet; and
    based on the estimated first distance being longer than a first reference distance, generating a second type notification signal.

5. The method of claim 4, wherein:
    the first reference distance is changeable based on a second user setting signal, and
    the generating the second type notification signal is enabled or disabled based on the second user setting signal.

6. The method of claim 4, wherein the first distance is estimated by tracking a signal strength of the sniffed first communication packet.

7. The method of claim 6, wherein the signal strength of the sniffed first communication packet is tracked based on a received signal strength indication (RSSI) algorithm.

8. The method of claim 4, wherein the generating the first notification signal further includes:
    based on the estimated first distance being shorter than or equal to the first reference distance, and further based on a variation in the estimated first distance being out of a first reference range, generating a third type notification signal.

9. The method of claim 8, wherein:
    the first reference range is changeable based on a third user setting signal, and
    the generating the third type notification signal is enabled or disabled based on the third user setting signal.

10. The method of claim 1, wherein the first link information includes:
    communication address information between the first external electronic device and the second external electronic device; and
    link key information related to encrypting and decrypting the first communication packet.

11. A method of operating an electronic device configured to communicate with a first external electronic device and a second external electronic device, the method comprising:
    transmitting, by the electronic device, a first communication link establishment request to the first external electronic device, the first communication link establishment request being a request for establishing a first communication link between the electronic device and the first external electronic device;
    transmitting, by the electronic device, a first communication link establishment completion response to the first external electronic device, the first communication link establishment completion response representing that an establishment of the first communication link is successfully completed;
    transmitting, by the electronic device, a second communication link establishment request to the second external electronic device, the second communication link establishment request being a request for establishing a second communication link between the electronic device and the second external electronic device;
    transmitting, by the electronic device, a second communication link establishment completion response to the second external electronic device, the second communication link establishment completion response representing that an establishment of the second communication link is successfully completed;
    receiving, by the electronic device, a first request from the first external electronic device, the first request being a request for providing first link information associated with the second communication link;
    transmitting, by the electronic device, the first link information associated with the second communication link to the first external electronic device; and
    exchanging, by the electronic device, a first communication packet with the second external electronic device based on the second communication link.

12. The method of claim 11, wherein the first communication link and the second communication link comprise Bluetooth connections.

13. The method of claim 11, wherein the first link information includes:
communication address information between the electronic device and the second external electronic device; and
link key information related to encrypting and decrypting the first communication packet.

14. A method of operating a status detection and notification system that includes a first electronic device, a second electronic device and a third electronic device, the method comprising:
transmitting, by the second electronic device, a first communication link establishment request to the first electronic device, the first communication link establishment request being a request for establishing a first communication link between the first electronic device and the second electronic device;
transmitting, by the second electronic device, a first communication link establishment completion response to the first electronic device, the first communication link establishment completion response representing that an establishment of the first communication link is successfully completed;
transmitting, by the second electronic device, a second communication link establishment request to the third electronic device, the second communication link establishment request being a request for establishing a second communication link between the second electronic device and the third electronic device;
transmitting, by the second electronic device, a second communication link establishment completion response to the third electronic device, the second communication link establishment completion response representing that an establishment of the second communication link is successfully completed;
receiving, by the second electronic device, a first request from the first electronic device, the first request being a request for receiving first link information associated with the second communication link;
transmitting, by the second electronic device, the first link information associated with the second communication link to the first electronic device; and
exchanging, by the second electronic device, a first communication packet with the third electronic device based on the second communication link,
wherein based on sniffing of the first communication packet, the sniffing being based on the first link information, a first notification signal related to a status of the third electronic device is provided to a user.

15. The method of claim 14, wherein the first link information includes:
communication address information between the second electronic device and the third electronic device; and
link key information related to encrypting and decrypting the first communication packet.

16. The method of claim 14, wherein the first notification signal includes at least one of:
a first type notification signal that is generated based on the first communication packet not being sniffed for a first time interval,
a first distance-away notification signal that is generated based on a first distance between the second electronic device and the third electronic device, which is estimated based on the sniffed first communication packet, being longer than a first reference distance, or
a first status check notification signal that is generated based on the estimated first distance being shorter than or equal to the first reference distance, and further based on a variation in the estimated first distance being out of a first reference range.

17. The method of claim 14, further comprising:
transmitting, by the second electronic device, a third communication link establishment request to a fourth electronic device included in the status detection and notification system, the third communication link establishment request being a request for establishing a third communication link between the second electronic device and the fourth electronic device;
transmitting, by the second electronic device, a third communication link establishment completion response to the fourth electronic device, the third communication link establishment completion response representing that an establishment of the third communication link is successfully completed;
receiving, by the second electronic device, a second request from the first electronic device, the second request being a request for receiving second link information associated with the third communication link;
transmitting, by the second electronic device, the second link information associated with the third communication link to the first electronic device; and
exchanging, by the second electronic device, a second communication packet with the fourth electronic device based on the third communication link,
wherein based on sniffing of the second communication packet, the sniffing being based on the second link information, a second notification signal related to a status of the fourth electronic device is provided to the user.

18. The method of claim 14, wherein the first electronic device, the second electronic device and the third electronic device are portable electronic devices.

19. The method of claim 18, wherein the first electronic device is a wearable device including at least one of a smart watch, a smart band and smart glasses.

20. The method of claim 14, wherein the first communication link and the second communication link comprise Bluetooth connections.

* * * * *